US012173529B2

(12) United States Patent
Guillemette

(10) Patent No.: US 12,173,529 B2
(45) Date of Patent: Dec. 24, 2024

(54) REINFORCEMENT MEMBER FOR A DOOR, DOOR REINFORCEMENT SET, DOOR REINFORCEMENT DEVICE, DOOR FRAME REINFORCEMENT KIT AND DOOR SECURITY KIT

(71) Applicant: Christian Guillemette, Beauport (CA)

(72) Inventor: Christian Guillemette, Beauport (CA)

( * ) Notice: Subject to any disclaimer, the term of this patent is extended or adjusted under 35 U.S.C. 154(b) by 0 days.

(21) Appl. No.: 18/271,894

(22) PCT Filed: Nov. 10, 2021

(86) PCT No.: PCT/CA2021/051599

§ 371 (c)(1),
(2) Date: Jul. 12, 2023

(87) PCT Pub. No.: WO2022/204781

PCT Pub. Date: Oct. 6, 2022

(65) Prior Publication Data

US 2024/0035304 A1 Feb. 1, 2024

Related U.S. Application Data

(60) Provisional application No. 63/167,962, filed on Mar. 30, 2021.

(51) Int. Cl.

*E05B 17/20* (2006.01)
*E05B 9/00* (2006.01)
*E05B 15/02* (2006.01)

(52) U.S. Cl.

CPC .......... *E05B 17/2084* (2013.01); *E05B 9/002* (2013.01); *E05B 15/0205* (2013.01)

(58) Field of Classification Search

CPC ............. E05B 17/2084; E05B 15/0205; E05B 15/0245; E05B 9/002
See application file for complete search history.

(56) References Cited

U.S. PATENT DOCUMENTS 416,248 A * 12/1889 Arens ..................... E05B 9/002 70/450
552,868 A * 1/1896 Donahue ................. E05B 9/002 70/450

(Continued)

OTHER PUBLICATIONS

International Search Report and Written Opinion issued in corresponding International application No. PCT/CA2021/051599 on Jan. 17, 2022.

*Primary Examiner* — Christine M Mills
*Assistant Examiner* — Faria F Ahmad
(74) *Attorney, Agent, or Firm* — BCF LLP

(57) ABSTRACT

A reinforcement member for a door comprises a plate having a plurality of hooks extending on one face of the plate. The reinforcement member is shaped for mounting on a door stile or on a strike jamb of a door frame, on one side of a locking member opening. The reinforcement member is maintained on the door stile or on the strike jamb by insertion of the hooks in a material of the door stile or strike jamb. A set may include a pair of reinforcement members for placing on both sides of the locking member opening. Two members may be integrated as one piece via a pair of bridges, or integrated in a faceplate or a strike plate. Kits may include the reinforcement members and a back plate for mounting behind a door frame with screws.

3 Claims, 24 Drawing Sheets

(56) References Cited

U.S. PATENT DOCUMENTS

| | | | | | |
|---|---|---|---|---|---|
| 941,877 | A * | 11/1909 | Hosch | E05B 17/2003 292/346 |
| 997,074 | A * | 7/1911 | Matheson | E05B 9/002 70/450 |
| 1,231,556 | A * | 7/1917 | Bauer | E05D 5/04 19/128 |
| 1,670,510 | A * | 5/1928 | Kiehler | E05B 15/0245 292/341.18 |
| 2,484,024 | A * | 10/1949 | Garberding | E05D 15/00 292/346 |
| 2,668,074 | A * | 2/1954 | Falk | E05C 3/041 292/241 |
| 2,678,843 | A * | 5/1954 | Steffan | F16B 37/041 292/341.18 |
| 2,692,158 | A * | 10/1954 | Tirschel | E05B 17/2003 292/346 |
| 2,795,452 | A * | 6/1957 | Schamel | E05B 15/0245 292/340 |
| 2,911,608 | A * | 11/1959 | Lee | H01R 4/489 439/92 |
| 3,244,443 | A * | 4/1966 | Rodgers | E05C 17/56 16/82 |
| 3,503,233 | A * | 3/1970 | Armstrong | E05B 9/084 70/451 |
| 3,764,173 | A * | 10/1973 | Griffith | E05B 17/2084 292/346 |
| 3,767,245 | A * | 10/1973 | Keefe | E05B 15/0205 292/340 |
| 3,815,945 | A * | 6/1974 | Lamphere | E05B 15/0205 D8/344 |
| 3,967,845 | A * | 7/1976 | Governale | E05B 15/0205 292/346 |
| 4,017,106 | A | 4/1977 | Salazar | |
| 4,057,275 | A * | 11/1977 | La Beaud | E06B 1/52 49/504 |
| 4,126,343 | A * | 11/1978 | Ragland | E05B 15/0205 292/341 |
| 4,139,999 | A * | 2/1979 | Allenbaugh | E05B 17/2084 70/448 |
| 4,171,836 | A * | 10/1979 | St. Aubin | E05B 15/0245 292/DIG. 55 |
| 4,684,160 | A * | 8/1987 | Nelson | E05B 15/0205 49/503 |
| 4,832,388 | A | 5/1989 | Lozano | |
| 4,951,980 | A | 8/1990 | Wetzel | |
| 5,094,489 | A | 3/1992 | Jones | |
| 5,118,151 | A * | 6/1992 | Nicholas, Jr. | E05B 15/0245 292/341.19 |
| 5,456,507 | A * | 10/1995 | Jones | E05B 15/0205 292/346 |
| 5,474,347 | A | 12/1995 | Vigneault et al. | |
| 5,480,117 | A * | 1/1996 | Fleming, III | E05B 9/08 52/584.1 |
| 5,581,948 | A * | 12/1996 | Simonsen | E06B 1/52 16/388 |
| 5,586,796 | A * | 12/1996 | Fraser | E05B 15/0205 292/357 |
| 6,089,627 | A * | 7/2000 | Pearson | E05B 15/0205 292/DIG. 60 |
| 7,121,045 | B2 | 10/2006 | Massey et al. | |
| 7,730,691 | B2 * | 6/2010 | Patrick | E04G 23/0207 52/366 |
| 9,822,550 | B2 * | 11/2017 | Fenwick | E05B 15/022 |
| 10,240,353 | B2 * | 3/2019 | Procton | E06B 3/70 |
| 11,214,980 | B2 * | 1/2022 | Heid | E05B 15/024 |
| 2002/0139065 | A1 * | 10/2002 | Quarrels | E06B 1/52 52/576 |
| 2004/0060241 | A1 * | 4/2004 | Staples | E06B 7/28 206/325 |
| 2012/0200094 | A1 * | 8/2012 | Liu | E05B 65/104 292/92 |
| 2012/0286527 | A1 * | 11/2012 | Mullet | E05B 15/0245 292/341.18 |
| 2015/0218878 | A1 * | 8/2015 | Olberding | E05B 17/2084 49/460 |
| 2016/0348396 | A1 * | 12/2016 | Hunt | E05B 17/2003 |
| 2017/0058562 | A1 * | 3/2017 | Bunch | E05B 17/2084 |

* cited by examiner

REINFORCEMENT MEMBER FOR A DOOR, DOOR REINFORCEMENT SET, DOOR REINFORCEMENT DEVICE, DOOR FRAME REINFORCEMENT KIT AND DOOR SECURITY KIT

CROSS-REFERENCE

The present application claims priority from U.S. Provisional Patent Application Ser. No. 63/167,962, filed on Mar. 30, 2021, the disclosure of which is incorporated by reference herein in its entirety.

TECHNICAL FIELD

The present disclosure relates to the field of home security. More specifically, the present disclosure relates to a reinforcement member for a door, a door reinforcement set, a door reinforcement device, a door frame reinforcement kit and a door security kit.

BACKGROUND

Laminated doors, for example steels doors, are very popular due to their excellent energetic performance and good looks, and are generally perceived as being very safe and able to resist brute impacts. This perception may deceive the consumer and it is in fact fairly easy for burglars to break into houses by defeating laminated doors. FIG. 1 (Prior Art) illustrates a typical laminated door structure. FIG. 1 is not to scale. A door 10 has a perimetral wooden frame, usually made of pine, that includes a top rail 12 a bottom rail 14 extending horizontally, a pair of opposed door stiles 16 and 18 extending vertically, and insulation material 20 enclosed within the perimetral frame. One or more optional windows 22 may take some of the space occupied by the insulation material 20. Hinges (not shown) are mounted on the door stile 18 (called a hinge stile) for installation of the door 10 in a frame (not shown). The door stile 16 called a lock stile) may be reinforced by a wooden block 24, also usually made of pine, in which a cylinder opening 26 is provided for installation of a door lock. If there is no wooden block 24, the cylinder opening 26 is formed through the insulation material 20. The shown structure is cover on both faces by aesthetically pleasing surfaces, such as steel or fiberglass sheets (also called door skin), steel being the most common material used in the construction of laminated doors. Steel sheets 28 are not shown on FIG. 1, but are visible on later Figures.

One of the most commonly used type of locks securing doors in residential and commercial applications is the deadbolt lock. FIG. 2 (Prior Art) is an exploded view of a deadbolt lock 30. A cylinder 32 is received in the cylinder opening 26 of the door 10 and within inside and outside cylinder housings 34 that are mounted on opposite faces of the door 10. A bolt extension 38, a casing 39 and a deadbolt 40 are received in a bolt opening 42 (FIG. 3) formed in the door stile 16 and in the wooden block 24 of the door 10. The cylinder 32 is actuated by a key 36 (FIG. 4) and acts upon a cam of the bolt extension 38 such that action of the key 36 on the cam causes the deadbolt 40 to move between its retracted (unlocked) and extended (locked) positions in the casing 39 and in the bolt opening 42. A faceplate 44 is configured to be mounted on the door stile 16 using screws 47 inserted in the door stile 16 via screw openings 45 of the faceplate 44. The faceplate 44 has a central opening matching a size and shape of the bolt opening 42 formed in the door stile 16 and guides movements of the deadbolt 40 between its locked and unlocked positions. The deadbolt 40, when in its extended position, penetrates into a bolt opening of a door frame 46 (FIG. 4). Other details of the construction of the deadbolt lock 30 are not provided herein, as they are known to the skilled reader.

FIG. 3 (Prior Art) shows openings formed in the door 10 of FIG. 1 for installation of the deadbolt lock 30. The bolt opening 42 is formed in the door stile 16 and in the insulation material 20 (there is no wooden block 24 in the example of FIG. 3). The bolt opening 42 is perpendicular to the cylinder opening 26 and is arranged for the deadbolt 40 to move between the unlocked and locked position. A mortise 48 is formed on an outer surface of the door stile 16. The mortise 48 surrounds the bolt opening 42 and is shaped for receiving the faceplate 44. The steel sheets 28 (or etc. sheets) mounted on both faces of the door 10 are thin and modestly contribute to the structural integrity of the door 10.

FIG. 4 (Prior Art) shows a complete installation of the door 10, the deadbolt lock 30 and the door frame 46. The door frame 46 is not installed in an opening on a wall in order to illustrate the position of the deadbolt 40, which is in its extended (locked) position. The example of FIG. 4 shows that the door frame 46 includes metal (e.g. steel or aluminum) subframe 46A. However most typical installations include door frames 46 that are entirely made of wood.

It is difficult to defeat a deadbolt lock 30 by so-called “jimmying” action. However, most doors 10 with deadbolt locks 30 can be opened by exerting on such door 10 a brute force sufficient to break the perimetral wooden frame of the door 10 in the bolt opening area. FIGS. 5 and 6 (Prior Art) illustrate damage that may result from moderate impacts on the door 10. On FIG. 5, following the application of an impact on the door 10, the door stile 16 has cracked and the deadbolt 40 is now in an offset position from an axis of the bolt opening 42. As shown on FIG. 6, the door may have been opened by application of an additional impact. Of course, a single impact might lead to the same result as shown on FIG. 6, provided that this single impact is sufficiently strong. One or a few impacts may have resulted from application of brute force of a magnitude that one person may impose of the door 10, using that person’s own weight or using a blunt object. On FIG. 6, the deadbolt lock 30 has been removed from the door 10 after application of the impacts in order to better illustrate the damage to the door 10. At the time of the impacts, the deadbolt 40 was extending from the wooden block 24 and the door stile 16, through the faceplate 44 and into the door frame 46. Nothing else than the deadbolt 40 was maintaining the door 10 in the locked position. Consequently, the force of the impact was transferred to the deadbolt and further to the wooden block 24, the door stile 16 and the steel sheets 28. The door stile 16 and the wooden block 24 cracked open as a consequence of the impact, and the steel sheets 28 were somewhat distorted. The damage to the door 10 was such that the deadbolt 40 was no longer reaching the door frame 46 and the door 10 was opened, without retraction of the deadbolt 40 from its extended position. In the particular example of FIG. 5, the metal subframe 46A of the door frame 46 suffered some distortion. Most doors are mounted in wooden door frames that may withstand similar damages as do the doors themselves.

Despite their popularity and general use, laminated doors such as steel or fiberglass doors have continuously failed to provide the level of home security that the consumers expect.

Therefore, there is a need for improvements that compensate for problems related to the weaknesses of laminated doors and of related door frames.

SUMMARY

In a first aspect, various implementations of the present technology provide a reinforcement member fora door, comprising: a plate; and a plurality of hooks extending on one face of the plate the reinforcement member being shaped for mounting on a door stile on one side of a locking member opening formed on the door stile and for being maintained on the door stile by insertion of the hooks in a material of the door stile, a width of the plate being configured for allowing the plate to be contained within a width of the door stile.

In some implementations of the present technology, the plate has a generally rectangular perimeter.

In some implementations of the present technology, the reinforcement member further comprises one or more barbs formed on one or more of the hooks.

In some implementations of the present technology, the plate includes an internal opening within the generally rectangular perimeter.

In some implementations of the present technology, the hooks are neighbors to the internal opening.

In some implementations of the present technology, the hooks are distributed on two rows on both sides of the internal opening.

In some implementations of the present technology, the plate further comprises additional openings adjacent to the internal opening; and the hooks are formed by cutting and bending material of the plate for forming the internal opening and the additional openings.

In some implementations of the present technology, the generally rectangular perimeter of the plate includes two opposite short sides and two opposite long sides perpendicular to the short sides, the long sides defining the width of the plate; and one of the long sides includes an indentation adapted for allowing movement of a locking member when the reinforcement member is mounted on the door stile.

In some implementations of the present technology, the hooks are distributed along each of the two opposite long sides.

In a second aspect, various implementations of the present technology provide a door reinforcement set, comprising: two reinforcement members; the two reinforcement members being configured to allow mounting a first of the two reinforcement members on a first side of the locking member opening formed on the door stile and to allow mounting a second of the two reinforcement members on a second side of the locking member opening opposite from the first side of the locking member opening; and the door reinforcement set being configured for allowing the two reinforcement members to be contained within the width of the door stile when the two reinforcement members are mounted on the door stile.

In some implementations of the present technology, the two reinforcement members are sized and configured for allowing an outer perimeter formed by the two reinforcement members to be contained within a perimeter of a faceplate mountable on the door stile after mounting of the two reinforcement members on the door stile, the faceplate having an opening adapted to allow passage of a locking member; and the two reinforcement members are sized and configured so that the internal openings of the two reinforcement members allow passage of screws for mounting the faceplate on the door stile after mounting of the two reinforcement members on the door stile.

In a third aspect, various implementations of the present technology provide a door reinforcement device, comprising: two reinforcement members; the two reinforcement members being fixedly connected by a pair of bridges extending from lateral edges of the two reinforcement members so that the two reinforcement members and the pair of bridges form a unitary piece configured for encircling the locking member opening when the door reinforcement device is mounted on the door stile.

In a fourth aspect, various implementations of the present technology provide a door reinforcement device, comprising: two reinforcement members; the two reinforcement members being integrated in a faceplate mountable on the door stile, the faceplate having an opening adapted to allow passage of a locking member; and the internal openings of the two reinforcement members being positioned to allow passage of screws for mounting the door reinforcement device on the door stile.

In a fifth aspect, various implementations of the present technology provide a door reinforcement device, comprising: two reinforcement members; the two reinforcement members are integrated in a deadbolt guide insertable in the locking member opening formed on the door stile.

In some implementations of the present technology, the two reinforcement members and the deadbolt guide are further integrated with a faceplate mountable on the door stile, the faceplate having an opening adapted to allow passage of a locking member.

In a sixth aspect, various implementations of the present technology provide a reinforcement member fora door, comprising: a plate; and a plurality of hooks extending on one face of the plate; the reinforcement member being shaped for mounting on a strike jamb of a door frame on one side of a locking member opening formed on the strike jamb and for being maintained on the strike jamb by insertion of the hooks in a material of the door frame.

In some implementations of the present technology, the plate has a generally rectangular perimeter.

In some implementations of the present technology, the plate includes an internal opening within the generally rectangular perimeter.

In some implementations of the present technology, the reinforcement member further comprises one or more barbs formed on one or more of the hooks.

In some implementations of the present technology, the hooks are neighbors to the internal opening.

In some implementations of the present technology, the hooks are distributed on two rows on both sides of the internal opening.

In some implementations of the present technology, the plate further comprises additional openings adjacent to the internal opening; and the hooks are formed by cutting and bending material of the plate for forming the internal opening and the additional openings.

In some implementations of the present technology, the generally rectangular perimeter of the plate includes two opposite short sides and two opposite long sides perpendicular to the short sides, the long sides defining the width of the plate; and one of the long sides includes an indentation adapted for allowing movement of a locking member when the reinforcement member is mounted on the door stile.

In some implementations of the present technology, the hooks are distributed along each of the two opposite long sides.

In a seventh aspect, various implementations of the present technology provide a door reinforcement set, comprising: two reinforcement members; the two reinforcement members being configured to allow mounting a first of the two reinforcement members on a first side of the locking member opening formed on the strike jamb and to allow mounting a second of the two reinforcement members on a second side of the locking member opening opposite from the first side of the locking member opening.

In some implementations of the present technology, the two reinforcement members are sized and configured so that a perimeter of the door reinforcement set comprising the two reinforcement members does not extend beyond a perimeter of a strike plate mountable on the strike jamb after mounting of the two reinforcement members on the strike jamb, the strike plate having an opening adapted to allow passage of a locking member; and the two reinforcement members are sized and configured so that the internal openings of the two reinforcement members are positioned to allow passage of screws for mounting the strike plate on the strike jamb after mounting of the two reinforcement members.

In an eighth aspect, various implementations of the present technology provide a door reinforcement device, comprising: two reinforcement members; the two reinforcement members being fixedly connected by a pair of bridges extending from lateral edges of the two reinforcement members so that the two reinforcement members and the pair of bridges form a unitary piece configured for encircling the locking member opening when the two reinforcement members are mounted on the strike jamb.

In a ninth aspect, various implementations of the present technology provide a door reinforcement device, comprising: two reinforcement members; the two reinforcement members being integrated in a strike plate mountable on the strike jamb, the strike plate having an opening adapted to allow passage of a locking member; and the internal openings of the two reinforcement members being positioned to allow passage of screws for mounting the door reinforcement device.

In a tenth aspect, various implementations of the present technology provide a door frame reinforcement kit, comprising: a back plate having a first substantially flat surface and a second surface having a plurality of projections adapted for insertion in a material of a door frame; and the door reinforcement set; the kit being configured to allow: positioning the back plate on a back face of the strike jamb, mounting the reinforcement members of the door reinforcement set on the strike jamb, positioning a strike plate over the reinforcement members, inserting screws through screw openings of the strike plate, through the internal opening of each of the two reinforcement members and through the material of the door frame so that the screws pass through the back plate to maintain the door frame reinforcement kit in place on the door frame.

In some implementations of the present technology, the door frame reinforcement kit further comprises the strike plate.

In an eleventh aspect, various implementations of the present technology provide a door frame reinforcement kit, comprising: a back plate having a first substantially flat surface and a second surface having a plurality of projections adapted for insertion in a material of a door frame; and the door reinforcement device; the kit being configured to allow: positioning the back plate on a back face of the strike jamb, mounting the door reinforcement device on the strike jamb, positioning a strike plate over the door reinforcement device, inserting screws through screw openings of the strike plate, through the internal opening of each of the two reinforcement members and through the material of the door frame so that the screws pass through the back plate to maintain the door frame reinforcement kit in place on the door frame.

In some implementations of the present technology, the door frame reinforcement kit, further comprises the strike plate.

In a twelfth aspect, various implementations of the present technology provide a door frame reinforcement kit, comprising: a back plate having a first substantially flat surface and a second surface having a plurality of projections adapted for insertion in a material of a door frame; and the door reinforcement device; the kit being configured to allow: positioning the back plate on a back face of the strike jamb, mounting the door reinforcement device on the strike jamb, inserting screws through screw openings of the door reinforcement device and through the material of the door frame so that the screws pass through the back plate to maintain the door frame reinforcement kit in place on the door frame.

In a thirteenth aspect, various implementations of the present technology provide a door security kit, comprising: the door reinforcement set; and the door frame reinforcement kit.

In some implementations of the present technology, the door frame reinforcement kit further comprises one or more barbs formed on one or more of the projections In a fourteenth aspect, various implementations of the present technology provide a door security kit, comprising: the door reinforcement device; and the door frame reinforcement kit.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

Figure 9:
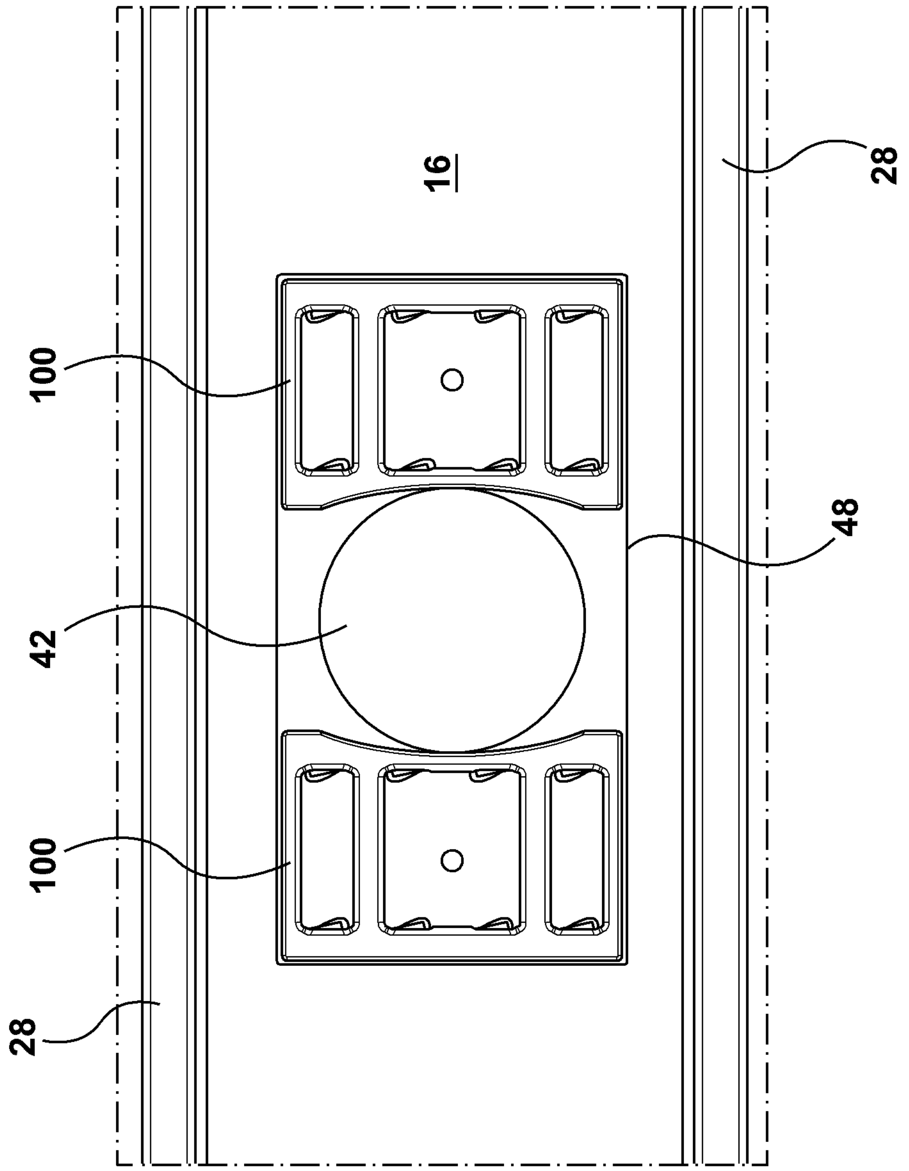
Figure 10:
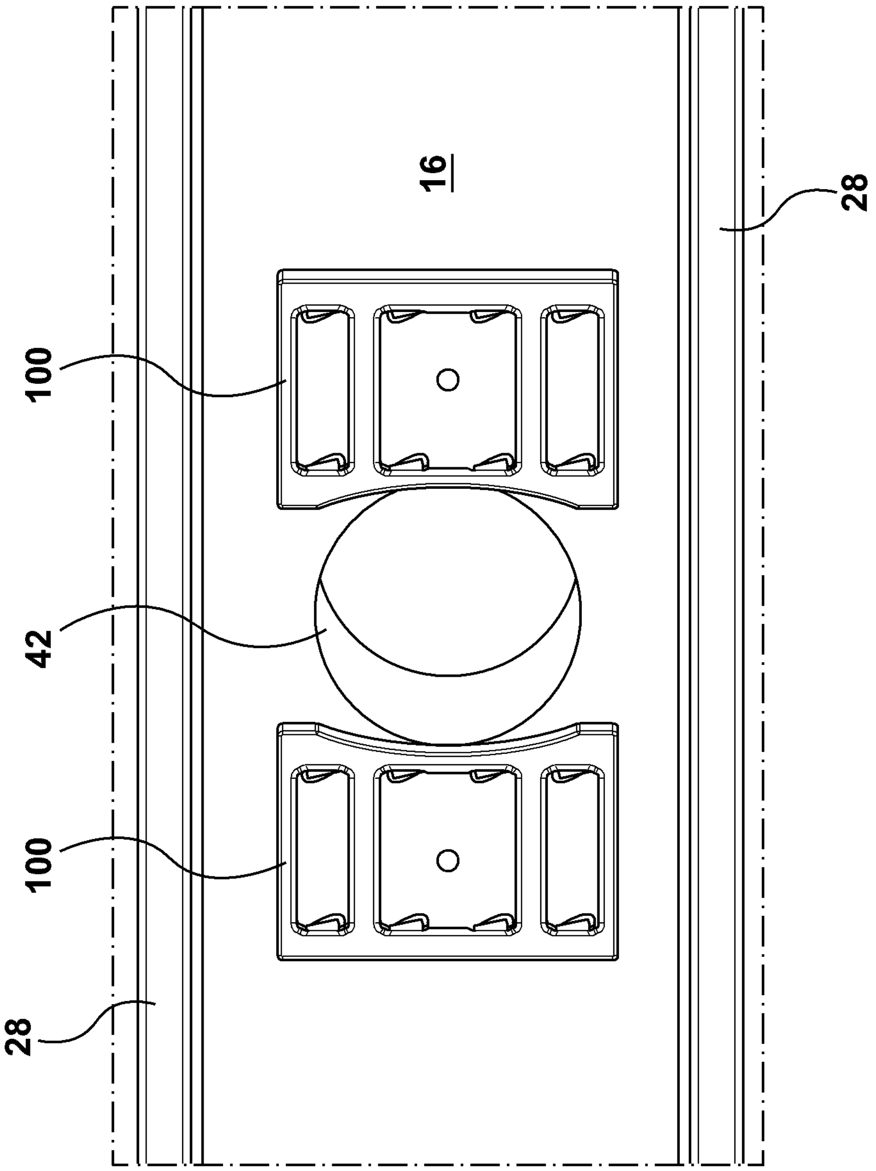
Figure 11:
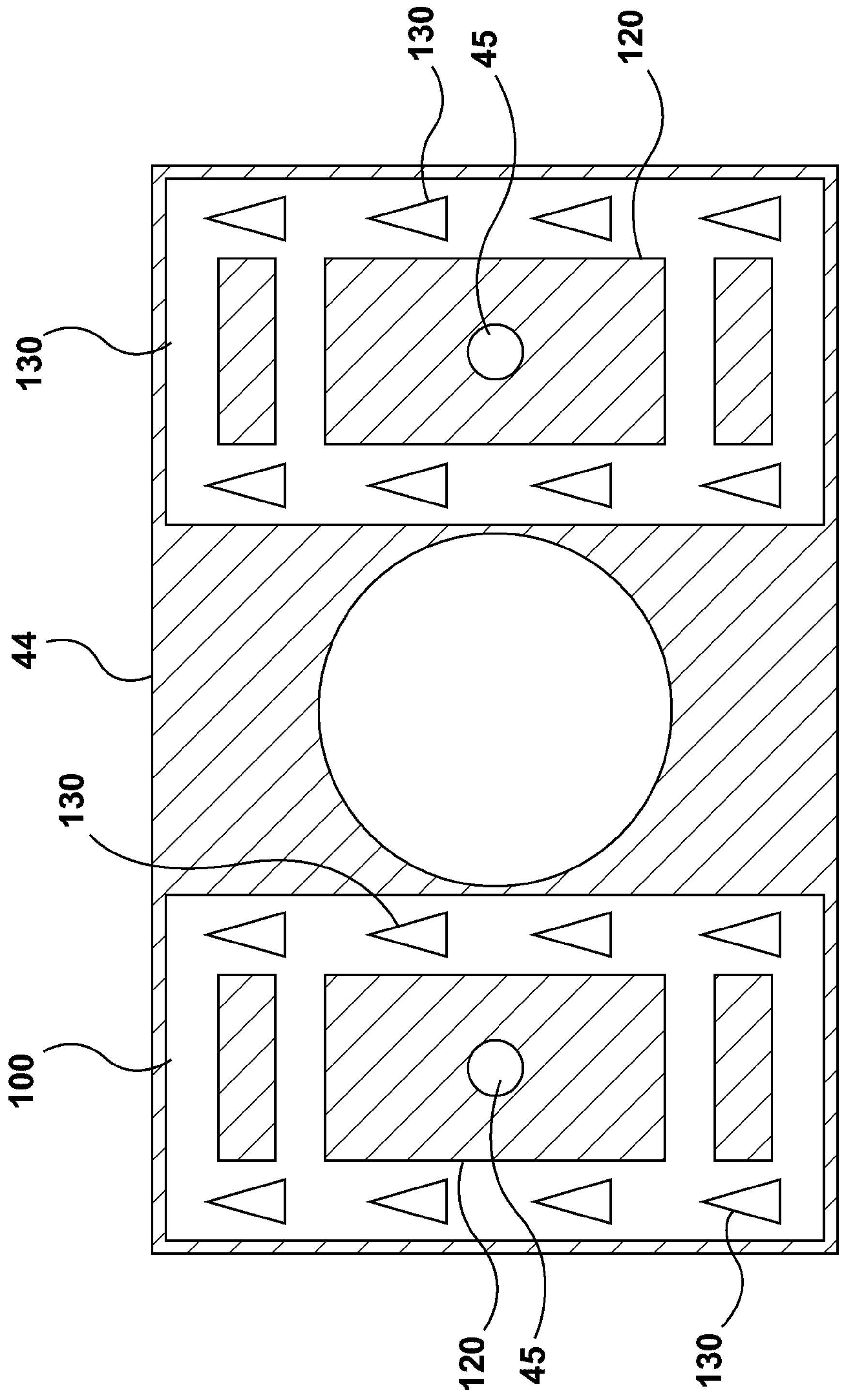
Figure 12B:
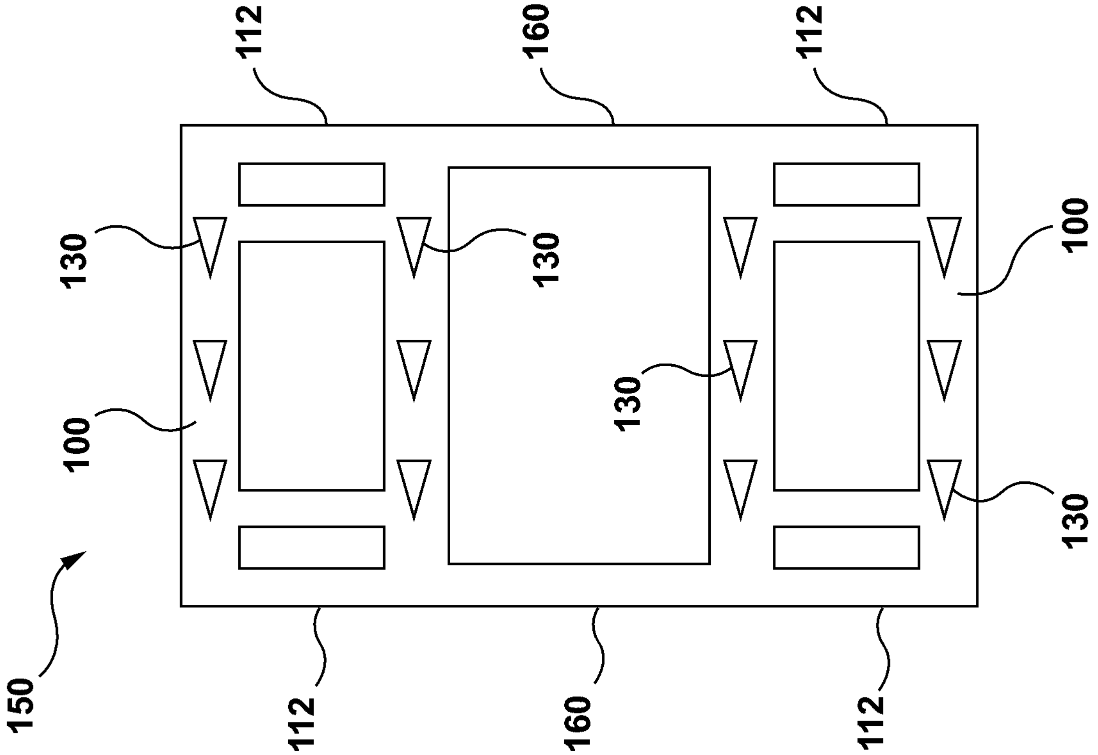
Figure 12A:
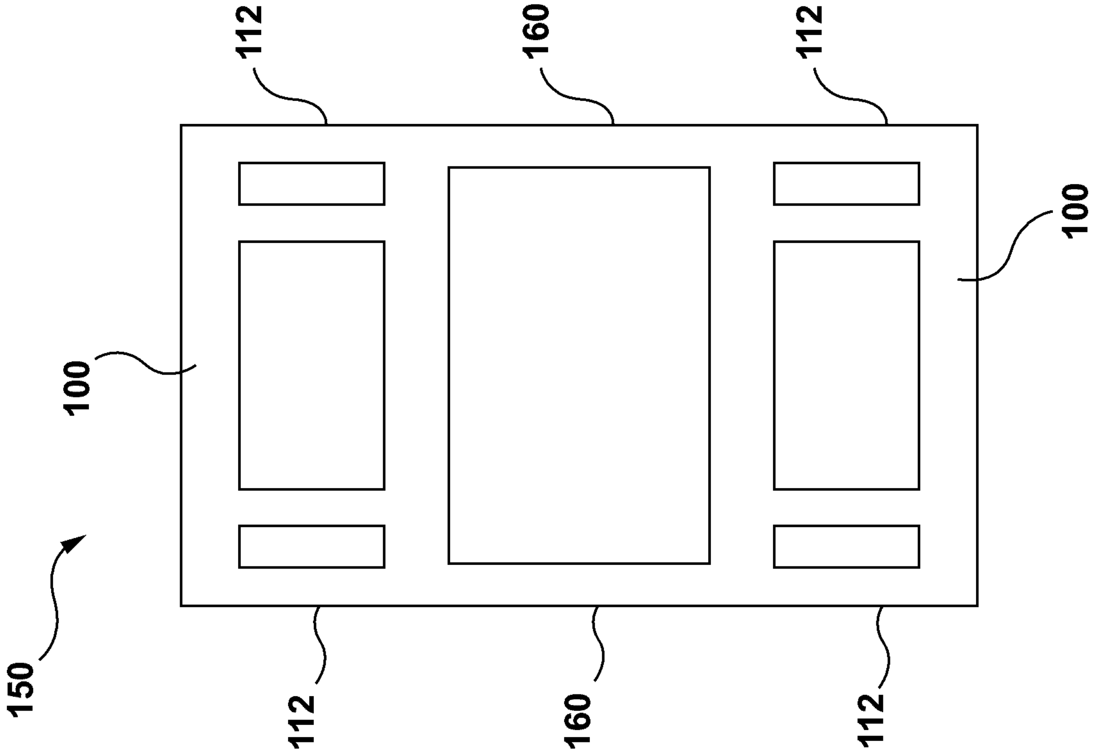
Figure 13B:
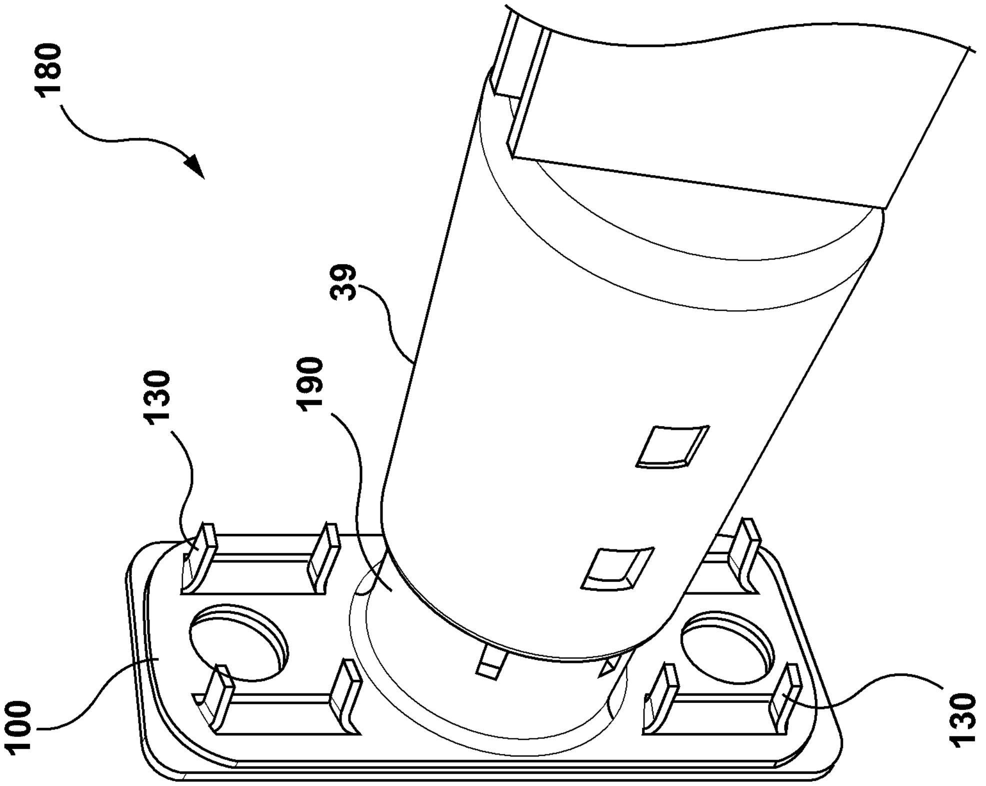
Figure 13A:
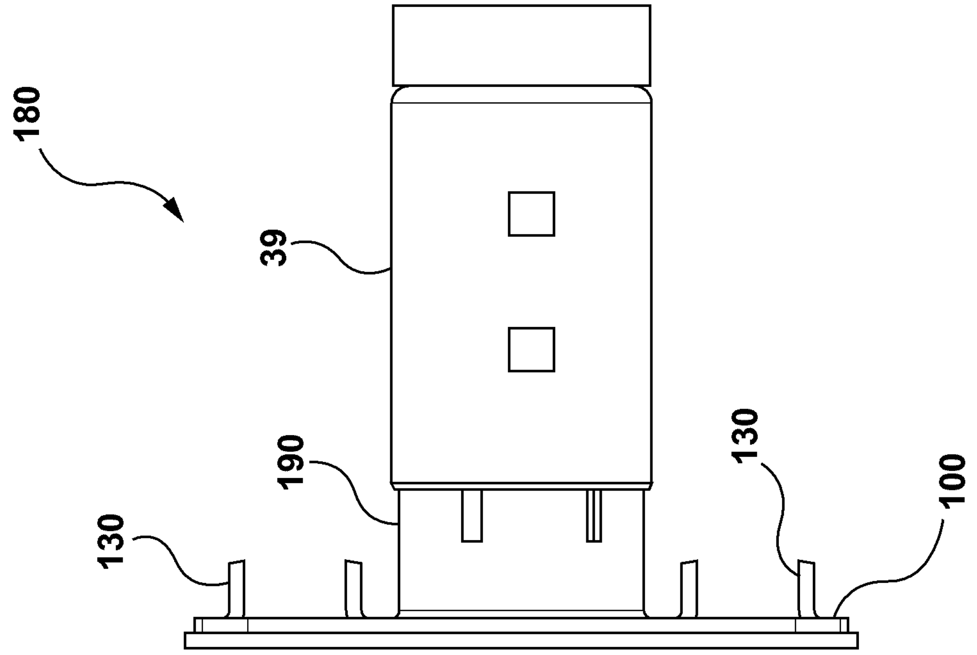
Figure 14:
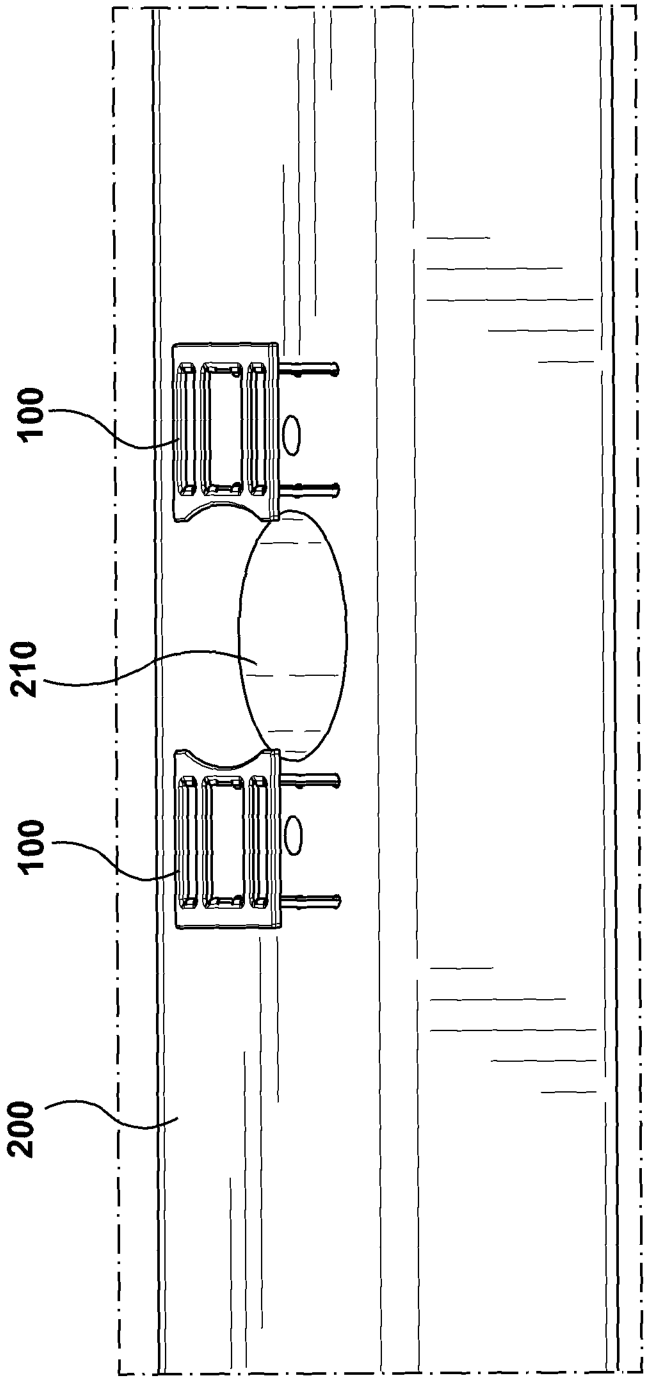
Figure 15:
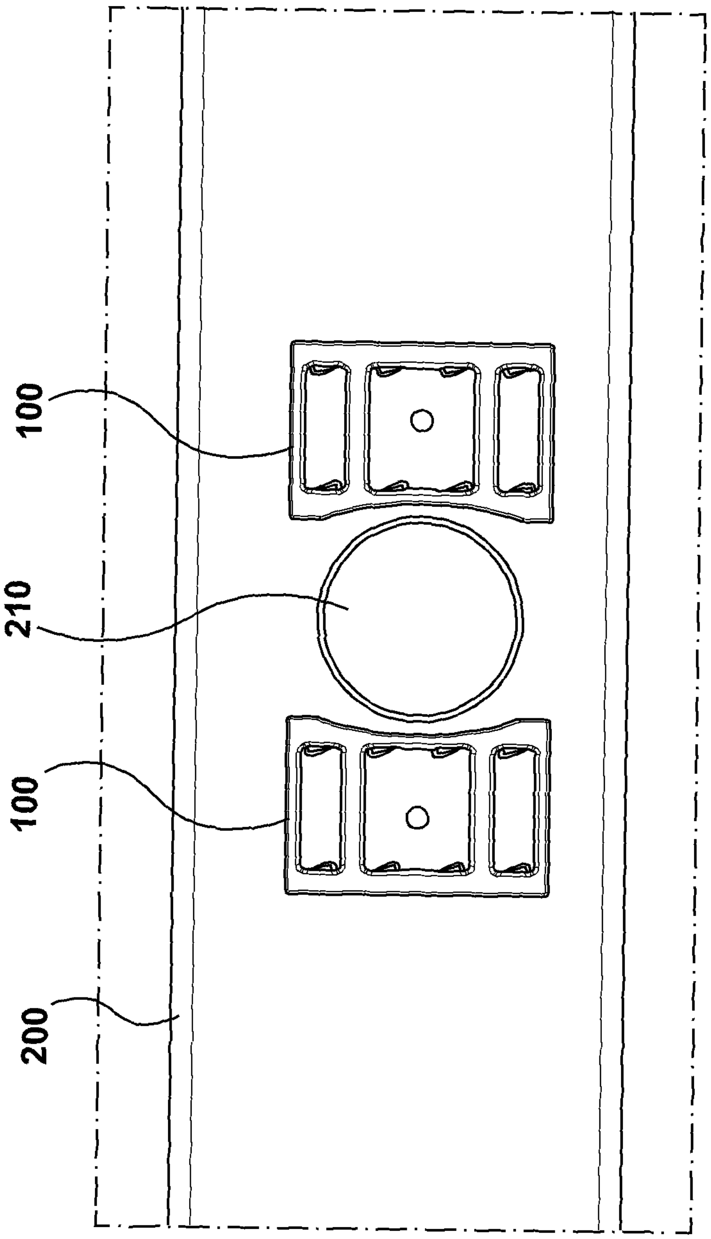
Figure 16:
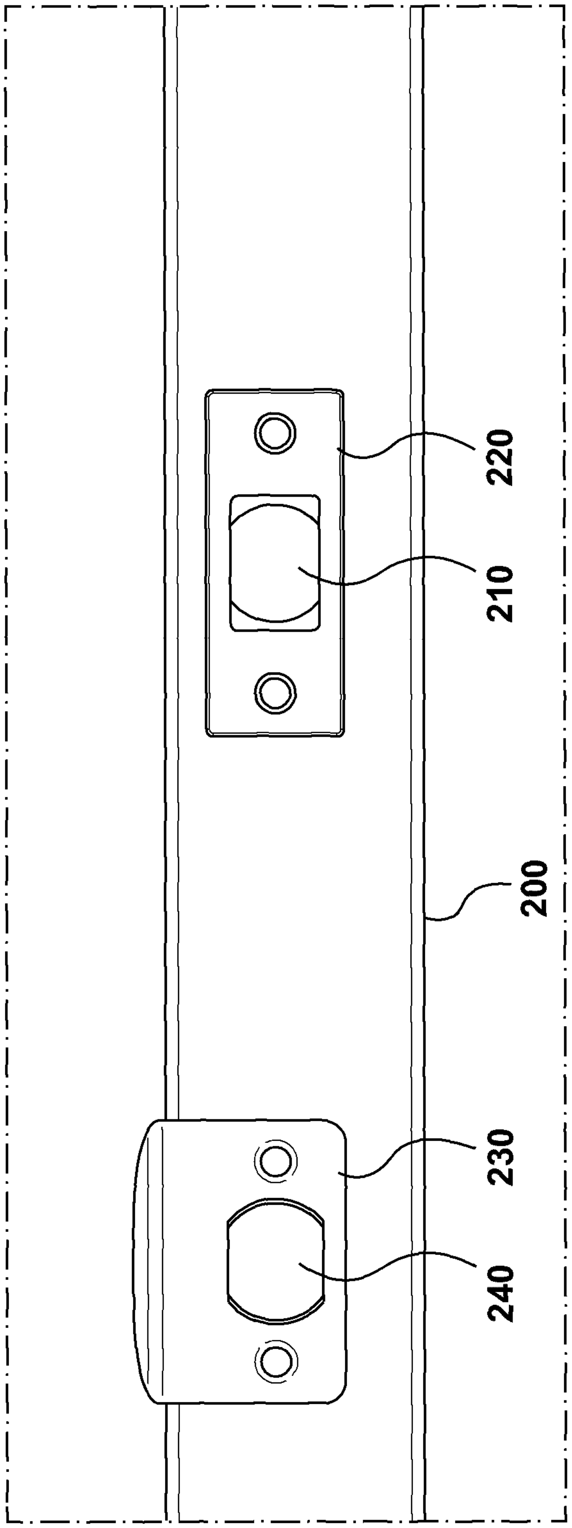
Figure 17:
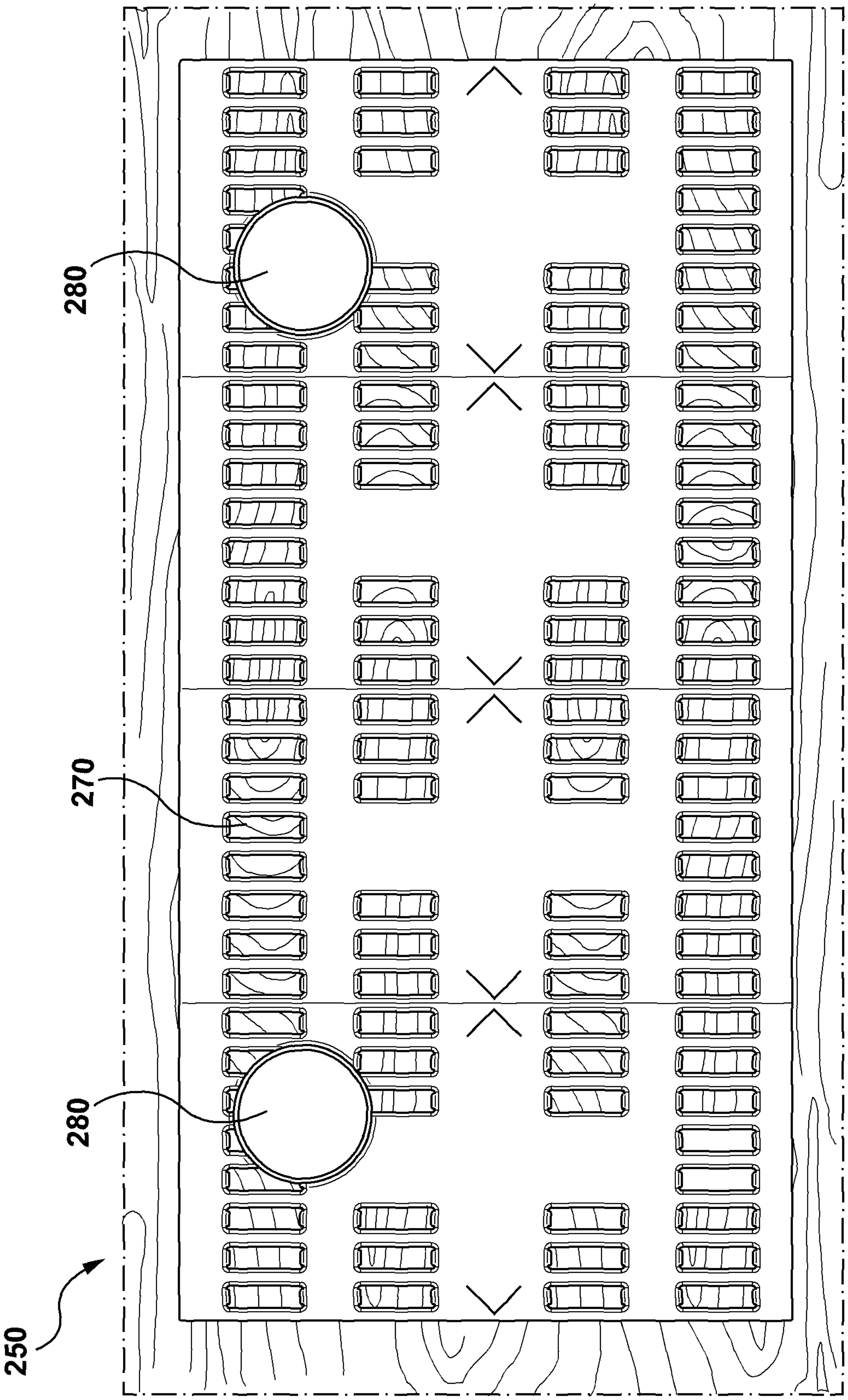
Figure 18:
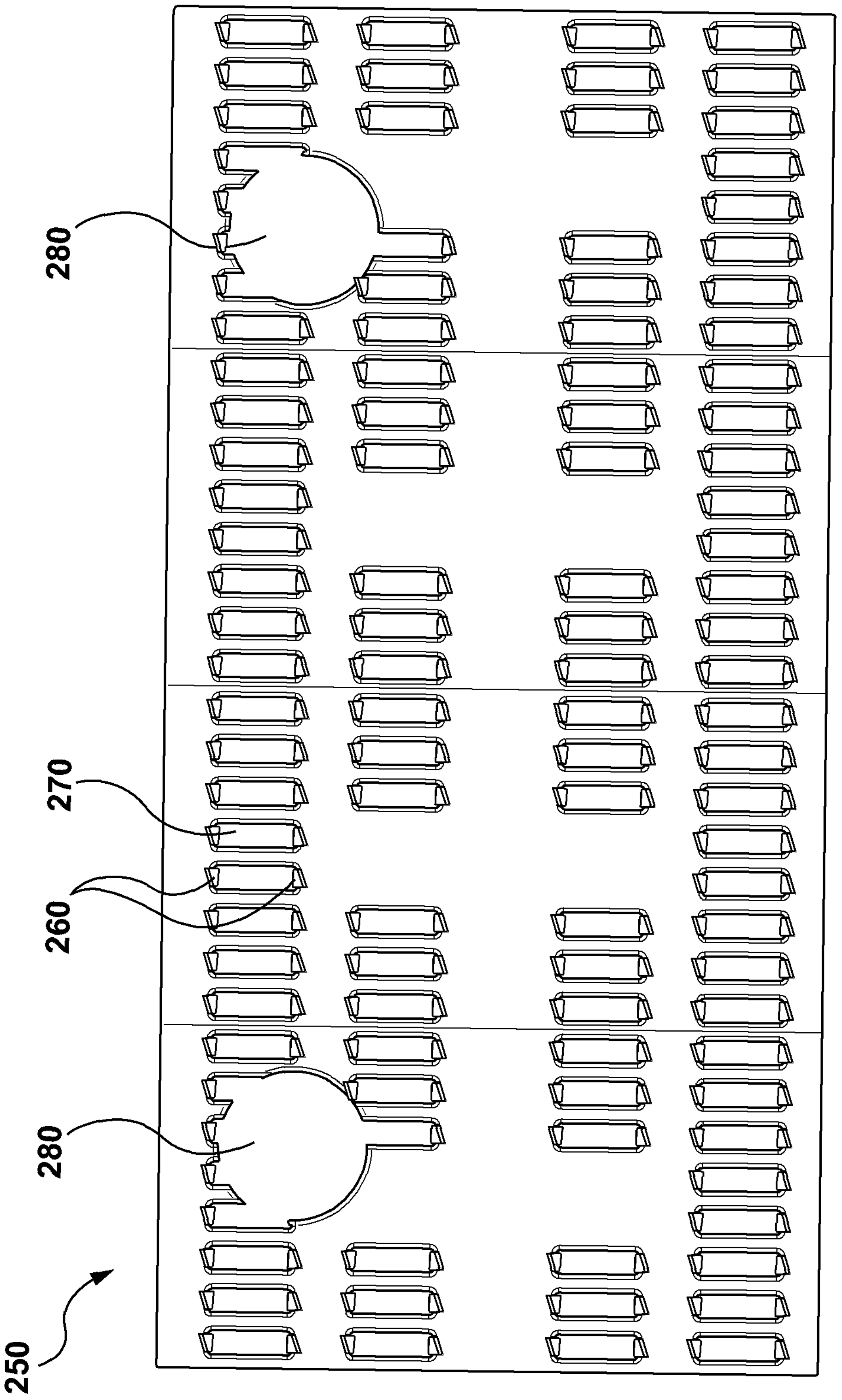
Figure 19:
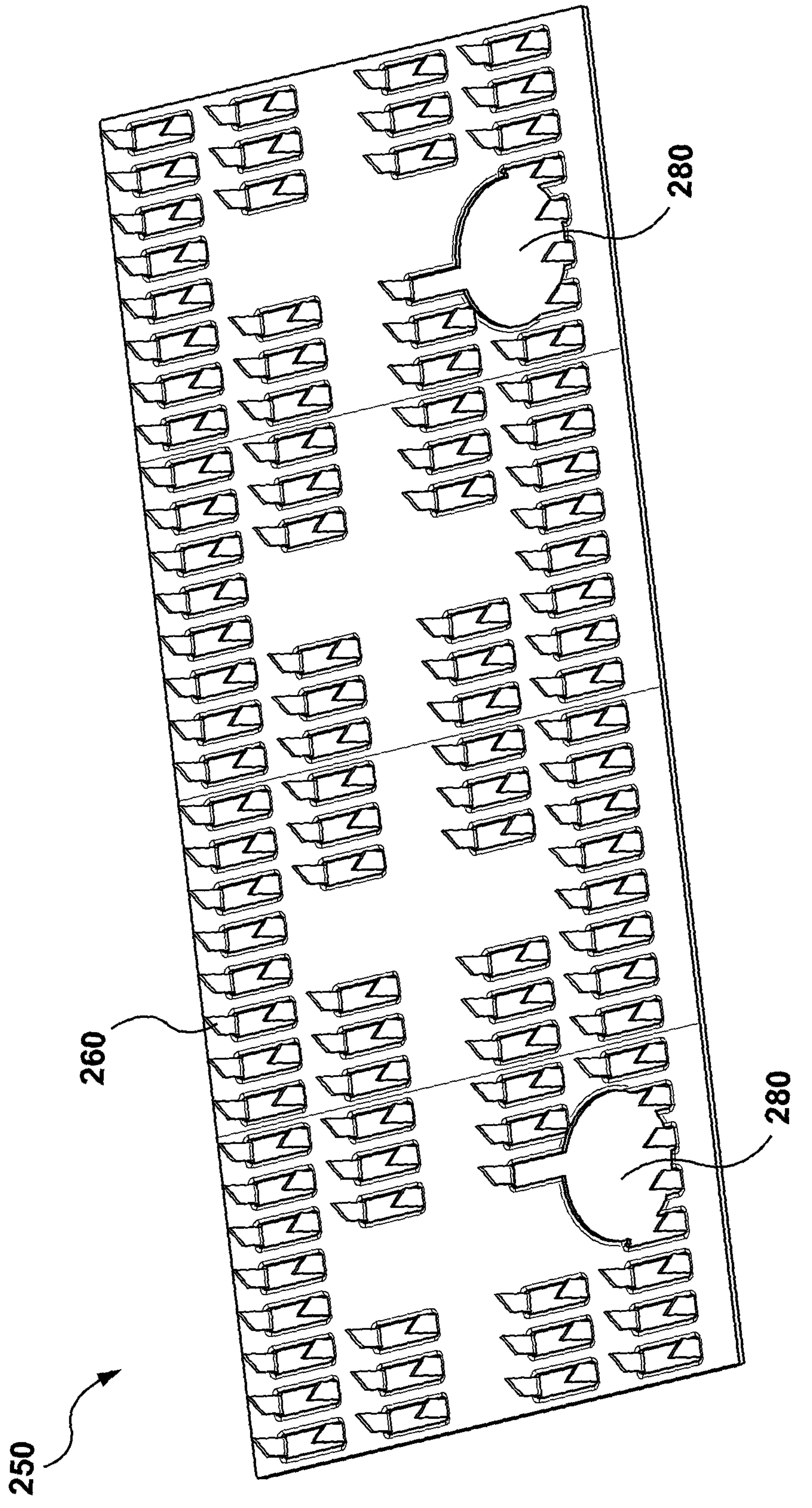
Figure 20:
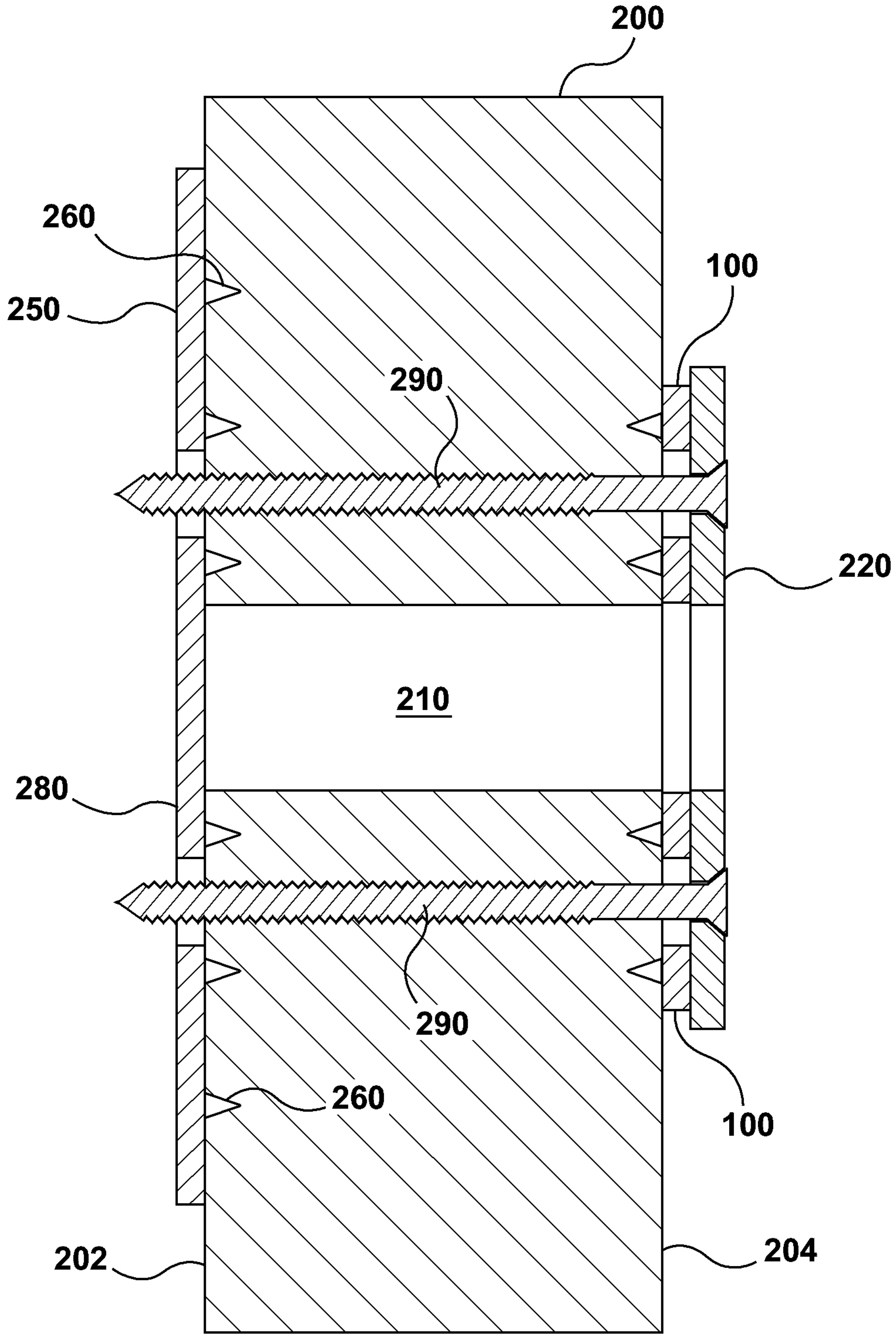
Figure 21:
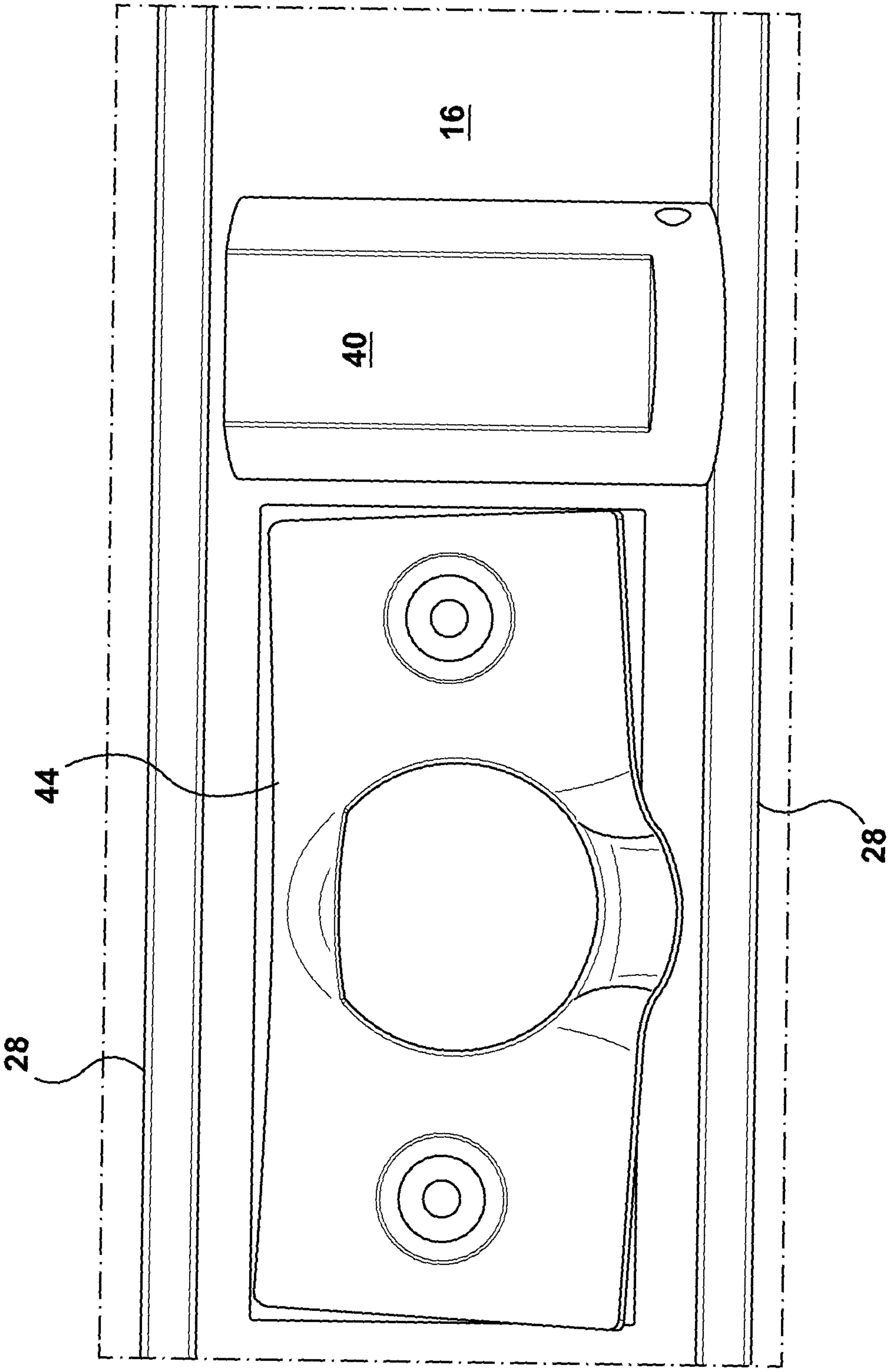
Figure 22:
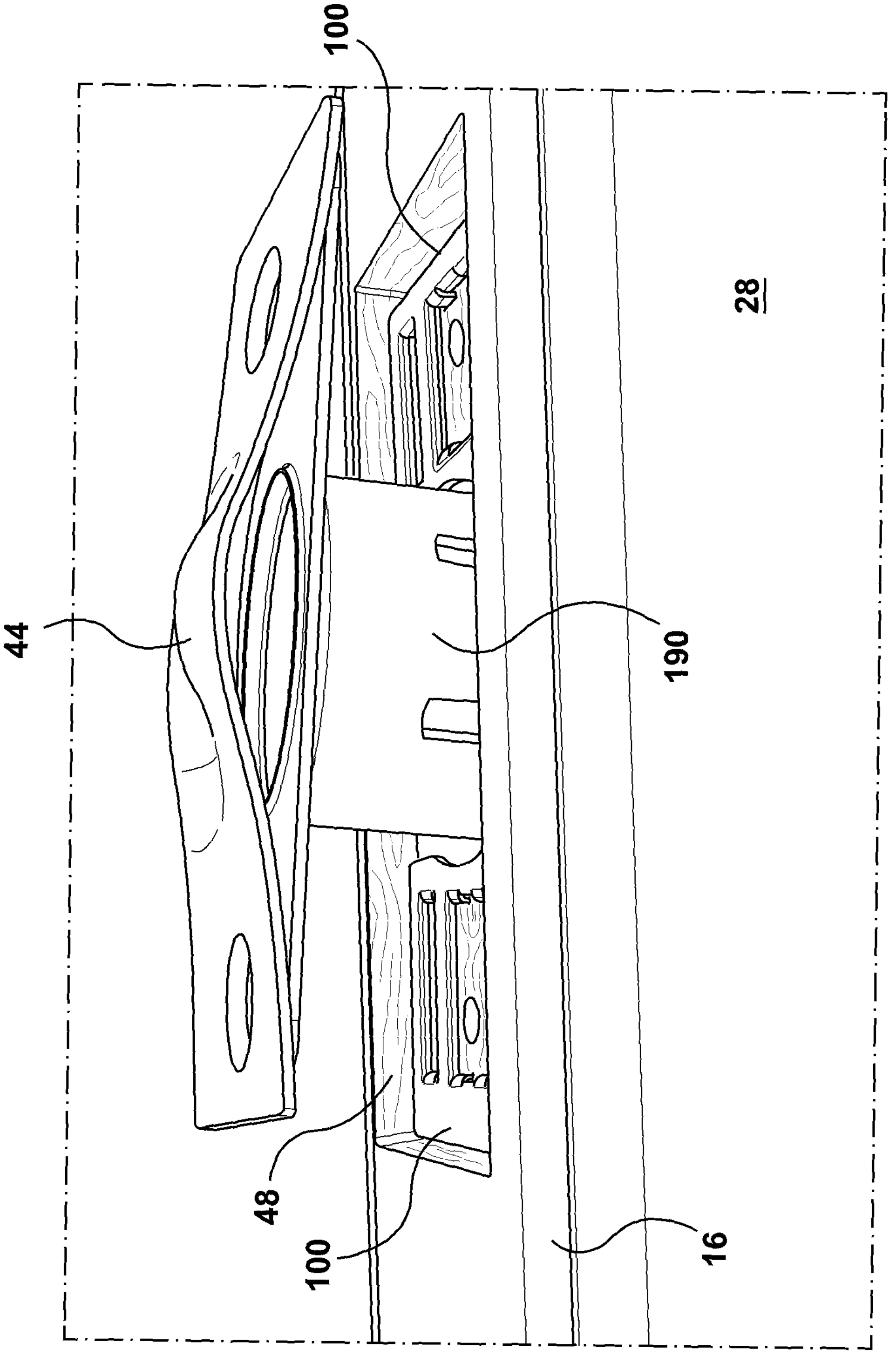
Figure 23:
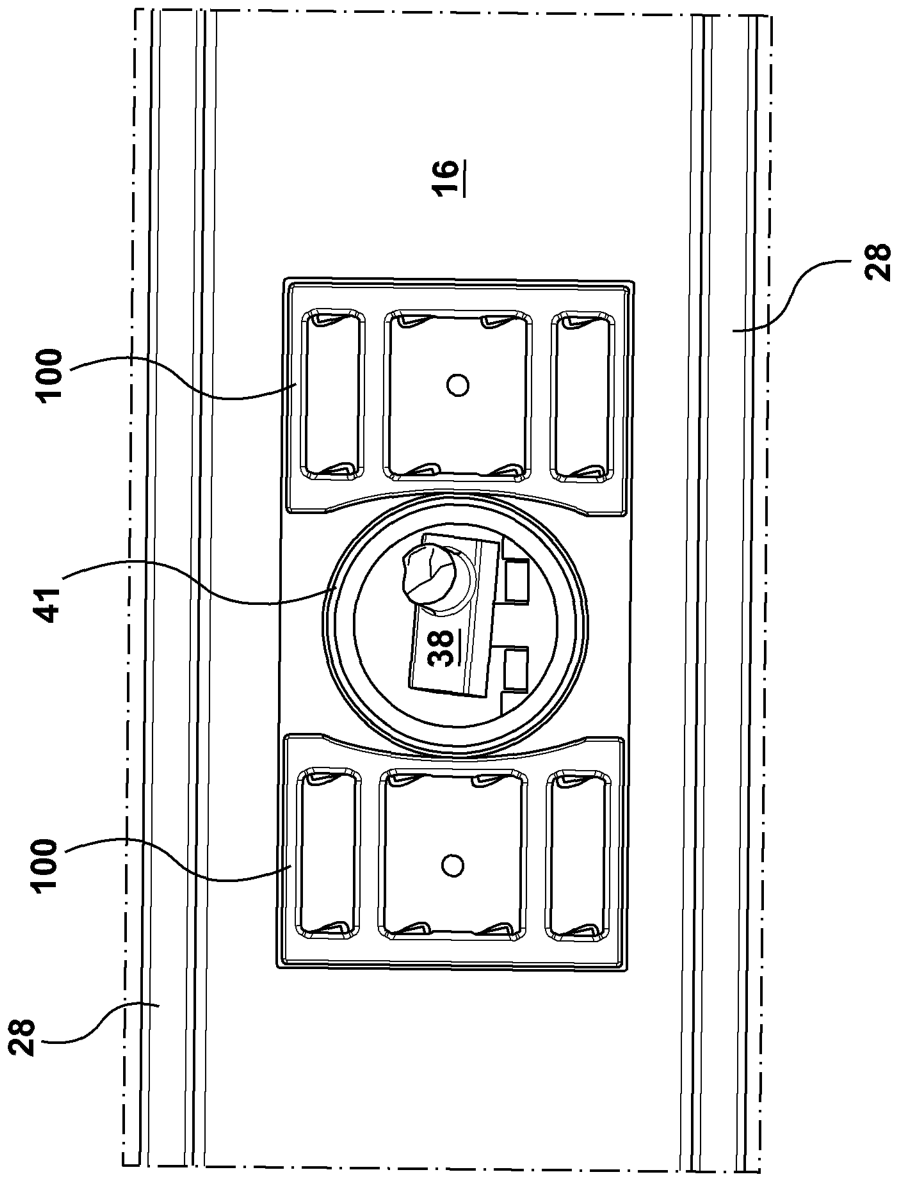

FIG. **8*a*** is a bottom perspective view of the reinforcement member according to an embodiment;

FIG. **8*b*** is a detailed, side elevation partial view of the reinforcement member showing the addition of a barb on a hooks according to an embodiment;

FIG. **8*c*** is a perspective view of a U-shaped reinforcement member according to an embodiment;

FIG. 9 shows a set including a pair of reinforcement members mounted in a mortise formed on a door stile according to an embodiment;

FIG. 10 shows a set including a pair of reinforcement members directly mounted on a door stile according to an embodiment according to an embodiment;

FIG. 11 is a bottom plan view of a pair of reinforcement members and of a faceplate according to an embodiment;

FIGS. 12*a* and 12*b* are respectively top and bottom plan views of a door reinforcement device integrating a pair of reinforcement members according to an embodiment;

FIGS. 13*a* and 13*b* are respectively side elevation and perspective views of a door reinforcement device integrating a pair of reinforcement members and a deadbolt guide insertable in a bolt opening formed on a door stile according to an embodiment;

FIG. 14 shows a set including a pair of reinforcement members ready to be mounted on a strike jamb of a door frame according to an embodiment;

FIG. 15 shows a set including a pair of reinforcement members mounted on the strike jamb of the door frame according to an embodiment;

FIG. 16 shows a strike plate and a latch plate mounted on the strike jamb of the door frame over pairs of reinforcement members according to an embodiment;

FIG. 17 is a first side view of a back plate according to an embodiment;

FIG. 18 is a second side view of the back plate showing a plurality of hooks according to an embodiment;

FIG. 19 is a perspective view of the back plate according to an embodiment;

FIG. 20 is a cross-sectional side view of a door frame reinforcement kit mounted on a strike jamb according to an embodiment;

FIG. 21 is a front view of the door stile, of the faceplate and of the deadbolt after impact on the door, the door stile being reinforced by the addition of a pair of reinforcement members;

FIG. 22 is a side view of the door stile, of the faceplate and of a deadbolt guide and of the pair of reinforcement members after impact on the door; and FIG. 23 is a front view of the pair of reinforcement members on the door stile after impact on the door.

Like numerals represent like features on the various drawings. The various Figures are not to scale.

DETAILED DESCRIPTION

Various aspects of the present disclosure generally address one or more of the problems related to the weaknesses of laminated doors and of related door frames.

A door stile, or a door frame, or both, are reinforced by the insertion of one or two reinforcement members in proximity to a locking member opening, for example a bolt opening or a door latch opening, formed in the door stile or in a strike jamb of the doorframe. Each reinforcement member comprises a plate having a plurality of hooks extending from one face of the plaque. One reinforcement member may be mounted on one side of the locking member opening and another reinforcement member may be mounted on an opposite side of the locking member opening. Surprisingly, the plate and the hooks inserted in the material (for example pine or another type of wood) of the door stile or of the door frame provide a very significant reinforcement of the material. As a result, a door having one or more reinforcement members mounted on its door stile and/or on its door frame becomes able to resist to much stronger impacts when compared to the same door without such reinforcement members.

Figure 7:
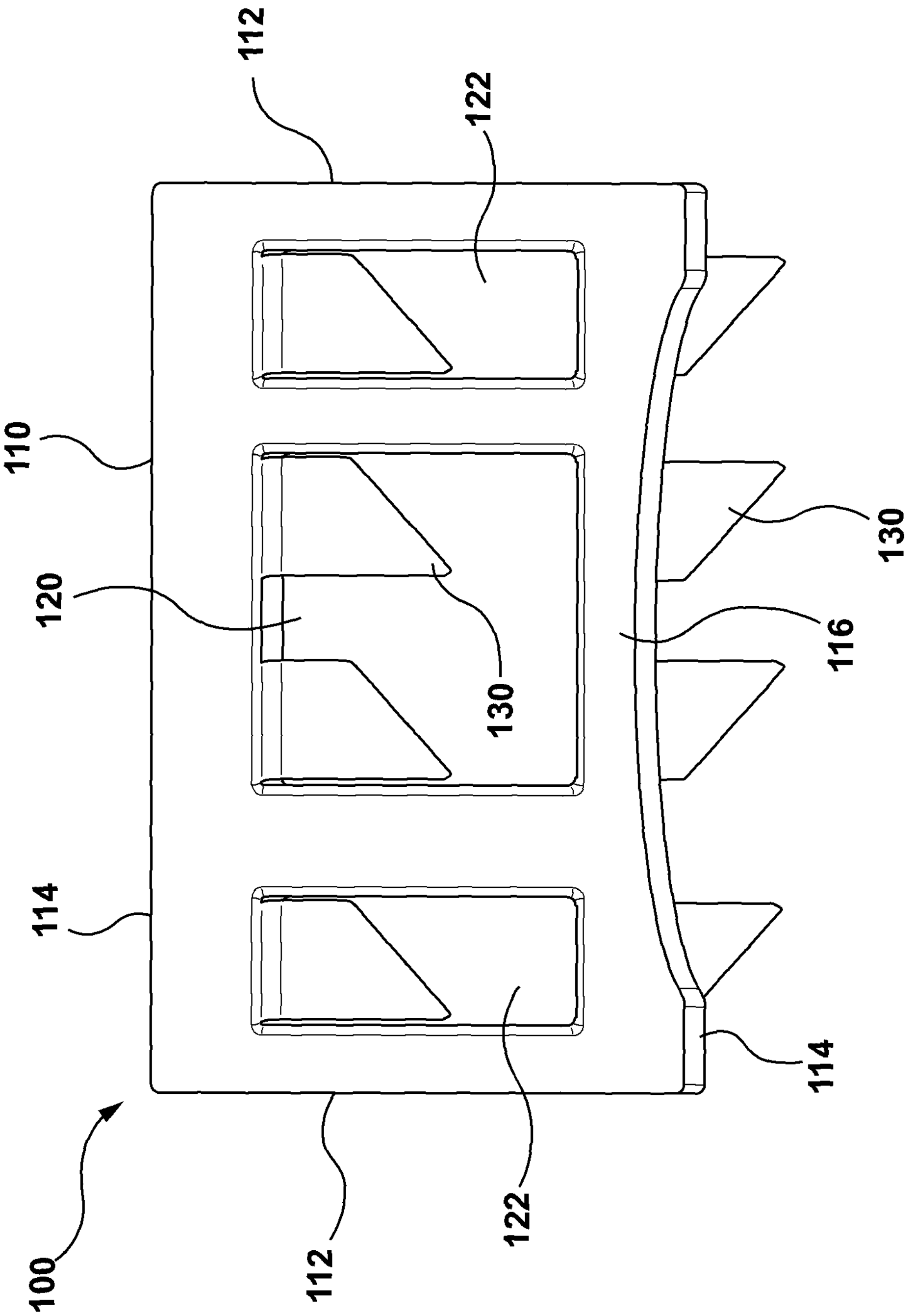
FIG. 7 is a top perspective view of a reinforcement member according to an embodiment.
Figure 8A:
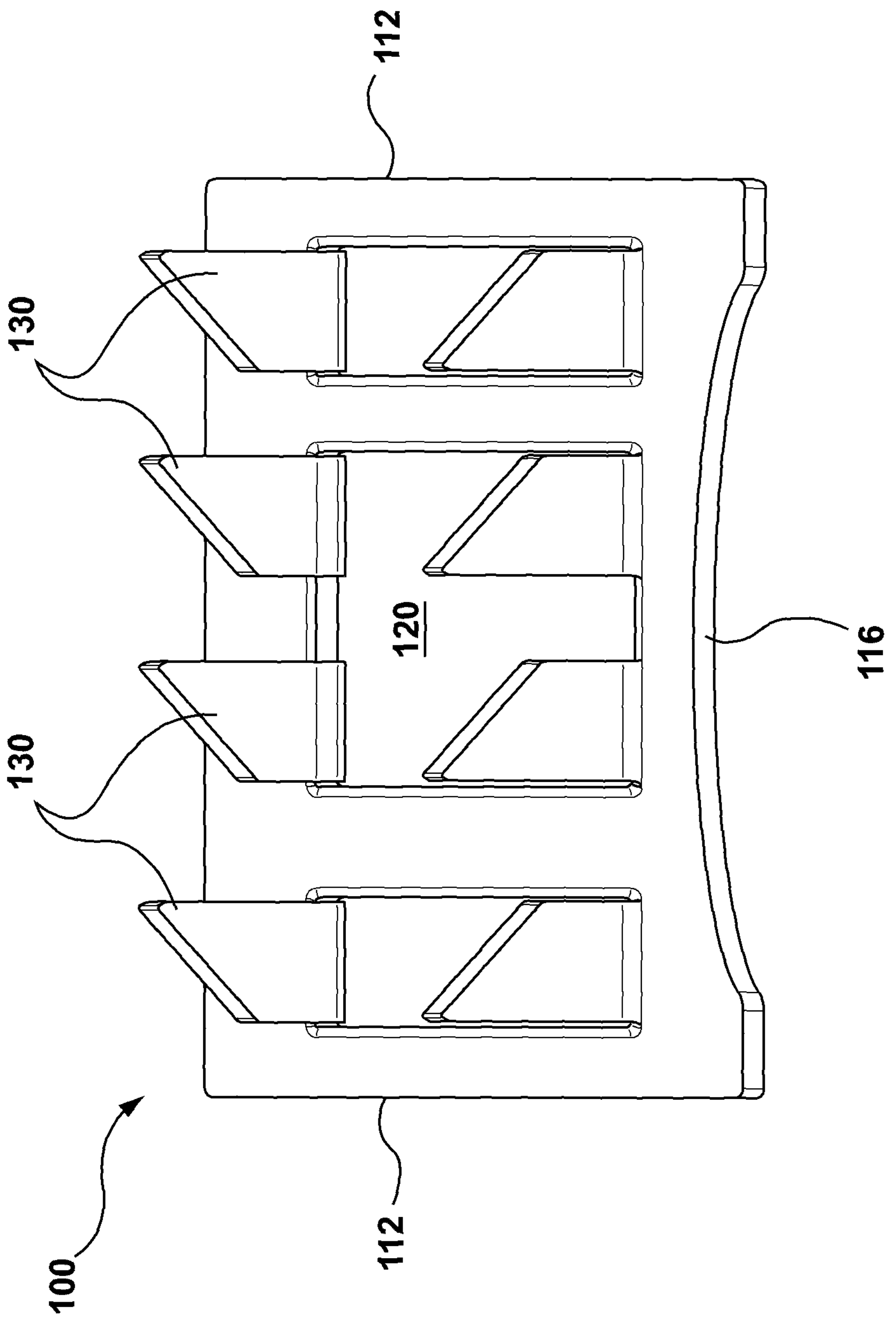

FIG. 7 is a top perspective view of a reinforcement member 100. FIG. 8*a* is a bottom perspective view of the reinforcement member 100. The reinforcement member 100 comprises a plate 110 having a generally rectangular perimeter and an internal opening 120. Additional openings 122 may or may not be formed in the plate 110 in various embodiments. A plurality of hooks 130 extend on one face of the plate 110. A minimum of two hooks 130 may be extend from the plate 110. In an embodiment, the hooks 130 are formed by cutting and bending the material of the plate 110 when forming the internal opening 120 and the additional openings 122 so that, as a result, the hooks 130 are neighbors to the internal opening 120 and to the additional openings 122. The reinforcement member 100 is shaped for mounting on the door stile 16 on one side of a locking member opening, such as the bolt opening 42 or a door latch opening, formed on the door stile 16 and for being maintained on the door stile 16 by insertion of the hooks 130 in a material of the door stile 16. Without limitation, the reinforcement member 100 may be hammered in plate in the on the door stile 16, without requiring any preparation other than the customary drilling of the cylinder opening 26 and of the bolt opening 42 or door latch opening, and the customary forming of the mortise 48. A width of the plate 110 is configured for allowing the plate 110 to be contained within a width of the door stile 16.

The generally rectangular perimeter of the plate 110 is defined by two opposite short sides 112 and two opposite long sides 114 substantially perpendicular to the short sides 112. Although corners at junctions of the short sides 112 and long sides 114 as shown are squared, such corners may be rounded in some embodiments. The long sides 114 define the width of the plate 110. As shown, one of the long sides 114 includes an optional indentation 116 adapted for positioning the reinforcement member 100 close of the bolt opening 42 while allowing movement of a locking member, such as the deadbolt 40 or a door latch (not shown), when the reinforcement member 100 is mounted on the door stile. Embodiments of the reinforcement member 100 without the indentation 116 are also contemplated. In the shown embodiment, the hooks 130 are neighbors to the internal opening 120, the hooks 130 being distributed along each of the two opposite long sides 114, on both sides of the internal opening 120.

Figure 8B:
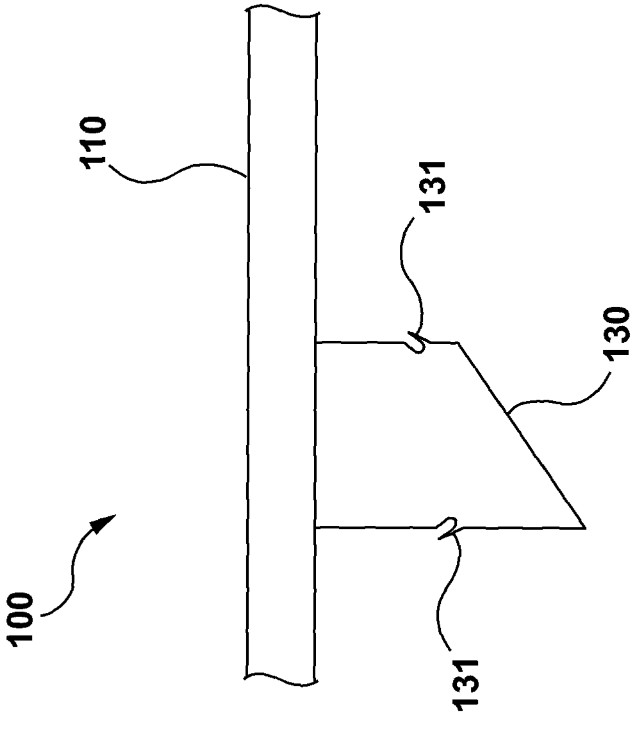

FIG. 8*b* is a detailed, side elevation partial view of the reinforcement member showing the addition of a barb on a hook according to an embodiment. In the embodiment of FIG. 8*b*, an optional barb 131 is formed on a hook 130. This barb 131 is akin to a "reverse hook" having a tip that points substantially in a direction that is opposite to a direction of a tip of the hook 130. Once the reinforcement member 100 is mounted on the door stile 16, the barb 131 may act to oppose any force that could attempt to pull the reinforcement member 100 away from the door stile 16. It is contemplated that one or more barbs 131 may be formed on one or more of the hooks 130.

Figure 8C:
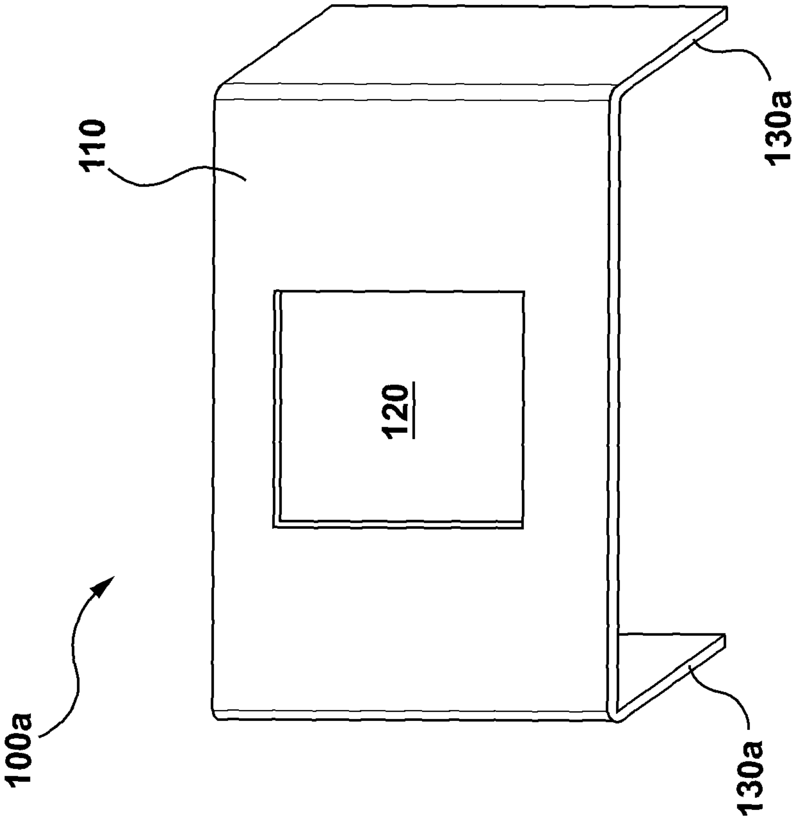

FIG. 8*c* is a perspective view of a U-shaped reinforcement member according to an embodiment. In the U-shaped reinforcement member 100*a*, the plate 110 is bent at both extremities to form a pair of wide hooks 130*a*. Preforming of corresponding grooves (not shown) within the mortise 48 formed on the door stile 16 may facilitate mounting of this version of the reinforcement member 100*a* on the door stile 16. It is contemplated that one or more barbs similar to the barbs 131 may be formed on the hooks 130*a* of the U-shaped reinforcement member 100*a*.

Variations of the reinforcement member are contemplated. For example and without limitation, in an embodiment, a reinforcement member may consist of a single metal strip including at least two hooks near extremities of the metal strip. The plate of the reinforcement member may have a triangular, round, oval or trapezoidal shape. In the same or other embodiments, a barb may be formed at the tip of each hook to prevent pulling out of the reinforcement member after insertion. The following examples will mainly refer to applications of the present reinforcement member 100 to reinforce a bolt opening 42 without limiting the use of the present reinforcement member 100 to reinforce other locking member openings, such as door latch openings.

Two reinforcement members 100 may be used in combination to become a door reinforcement set. FIG. 9 shows a set including a pair of reinforcement members 100 mounted in the mortise 48 formed on the door stile 16. The two reinforcement members 100 allow mounting one reinforcement member 100 on a first side of the bolt opening 42 formed on the door stile 16 and mounting the other reinforcement member 100 on a second side of the bolt opening 42 opposite from the first side of the bolt opening 42. The set formed of the two reinforcement members 100 may be installed while being contained within the width of the door stile 16 when the two reinforcement members 100 are mounted on the door stile 16.

Figure 1:
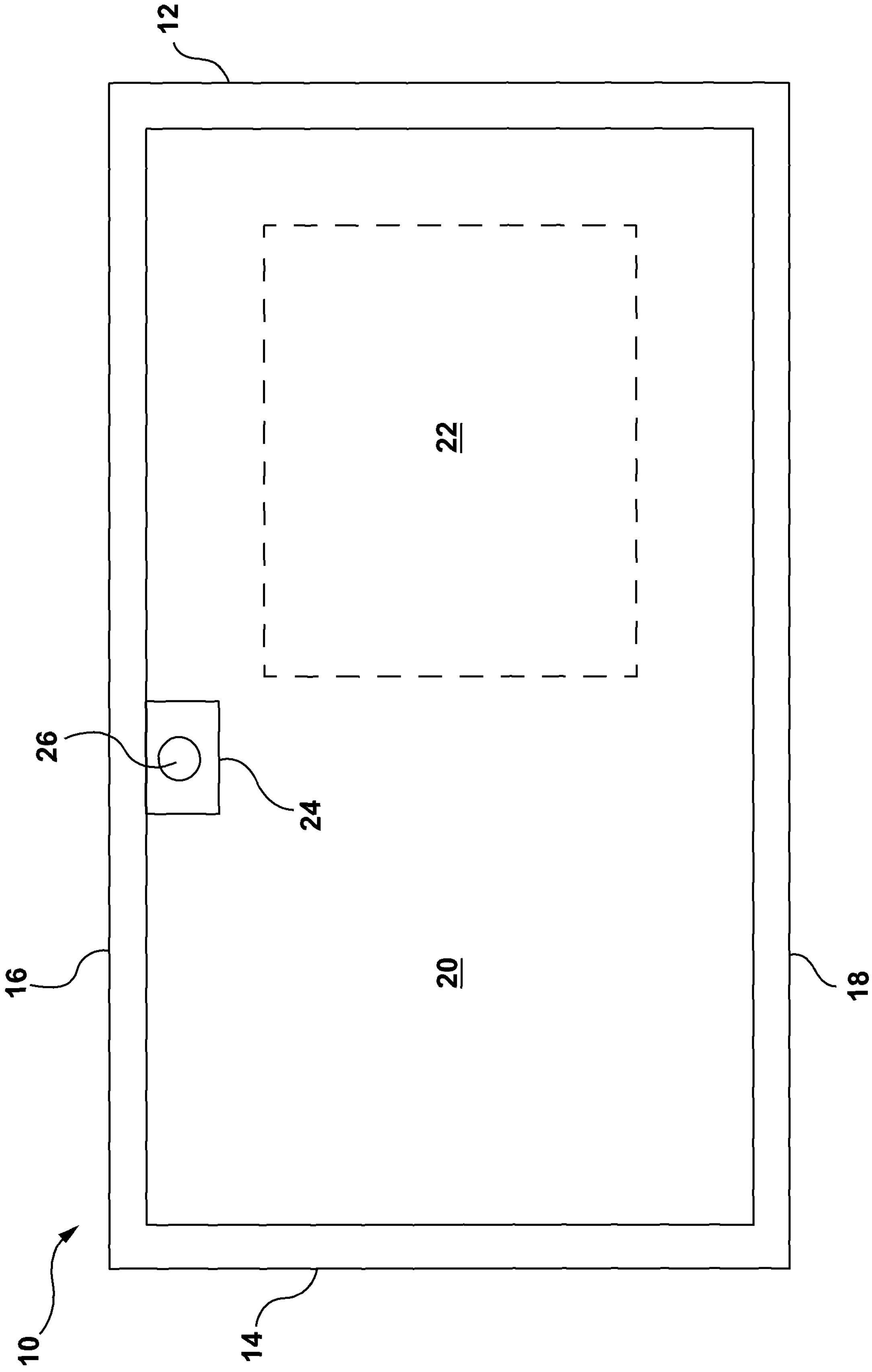
Figure 1 (Prior Art)
FIG. 1 (Prior Art) illustrates a typical laminated door structure.
Figure 2:
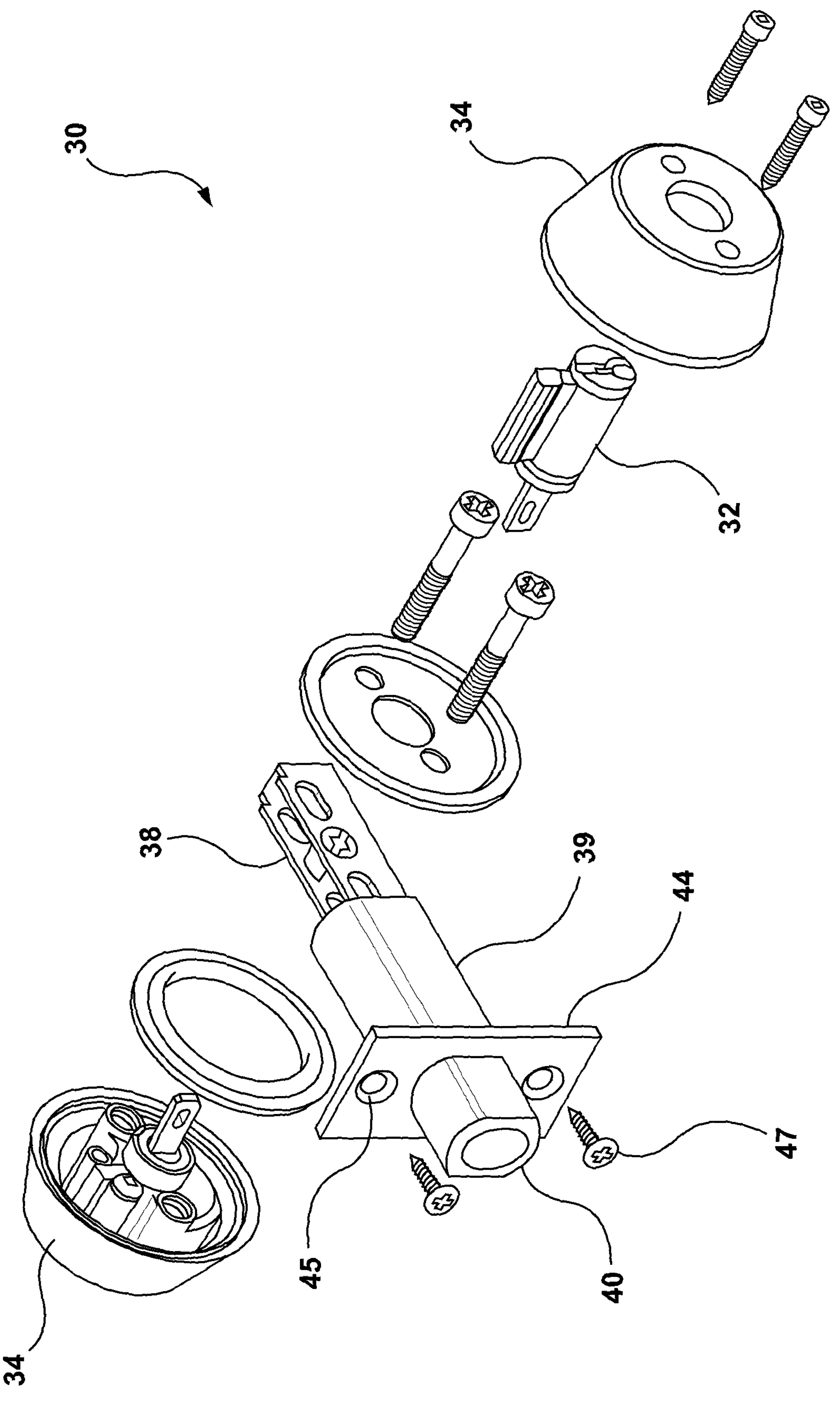
Figure 2 (Prior Art)
FIG. 2 (Prior Art) is an exploded view of a deadbolt lock.
Figure 3:
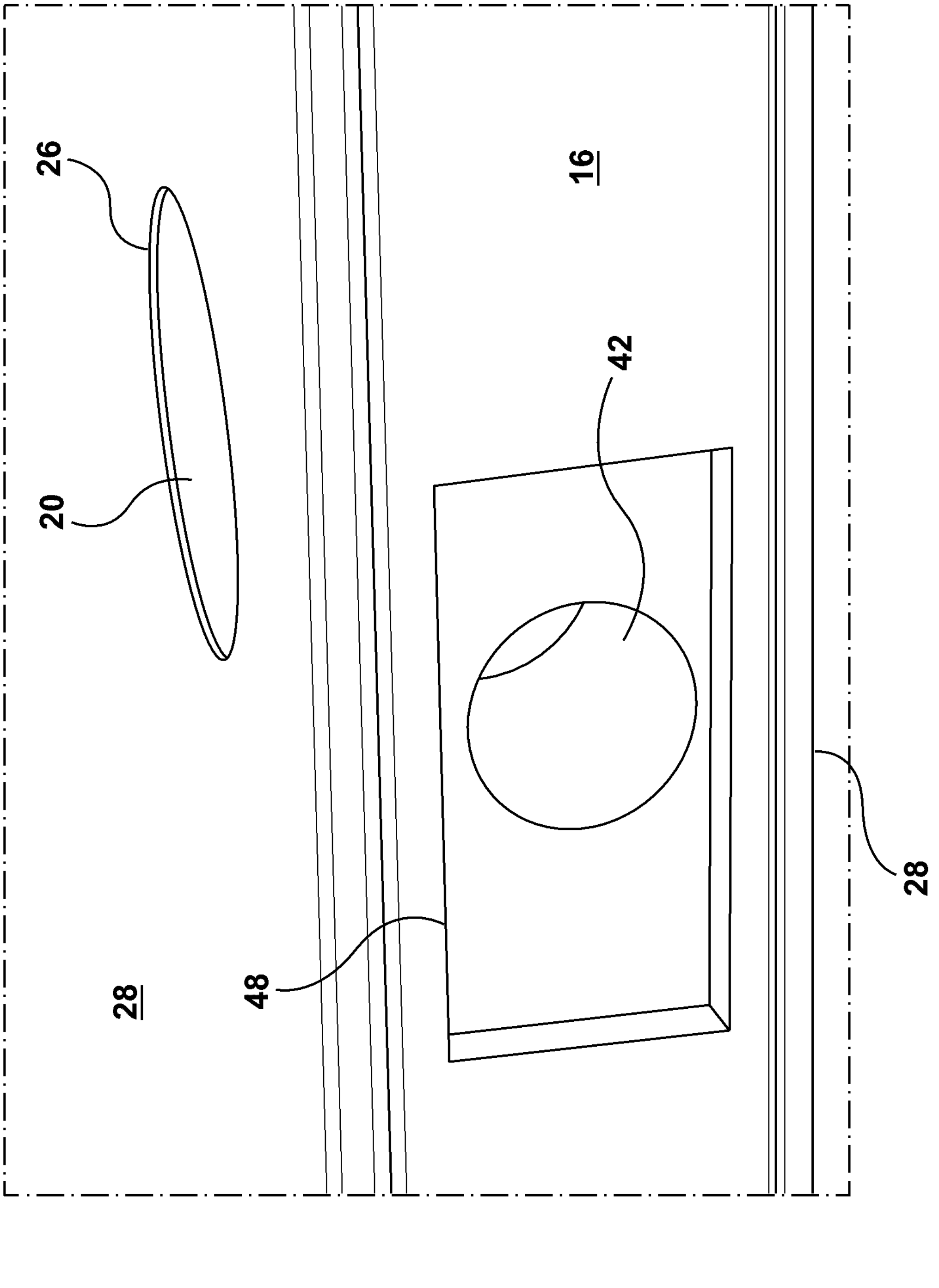
Figure 3 (Prior Art)
FIG. 3 (Prior Art) shows openings formed in the door of FIG. 1 for installation of the deadbolt lock.

FIG. 9 shows that the door reinforcement set may be installed in the mortise 48 formed in the door stile 16, the mortise 48 being also shaped for receiving the faceplate 44 (FIG. 2) after mounting of the reinforcement members 100. The two reinforcement members 100 may therefore be sized and configured to be fully contained underneath the faceplate 44. Some door installations do not use the faceplate 44, a cap (not shown) being mounted on the door stile 16 and fully covering the door stile 16. FIG. 10 shows a set including a pair of reinforcement members 100 directly mounted on the door stile 16. Forming of the mortise 48 is unnecessary in this configuration and the reinforcement members may be mounted on the surface of the door stile 16. Forming the reinforcement members 100 without the internal openings 120 is contemplated for use in the configuration of FIG. 10 because there is no need to allow for using the screws 47 for installing the faceplate 44. Mounting of extended reinforcement members covering a longer length of the door stile 16, or mounting of a plurality of reinforcement members distributed along the length of the door stile 16 is also contemplated.

FIG. 11 is a bottom plan view of a pair of reinforcement members 100 and of the faceplate 44. FIG. 11 is not to scale. A size and a configuration of the reinforcement members 100 allow an outer perimeter formed by the two reinforcement members 100 to be contained within a perimeter of the faceplate 44 when the faceplate 44 is mounted on the door stile 16 after mounting of the two reinforcement members 100 on the door stile 16. The internal openings 120 of the reinforcement members 100 allow passage of screws (not shown) via screw openings 45 of the faceplate 44 for mounting the faceplate 44 on the door stile 16 after mounting of the two reinforcement members 100 on the door stile 16. In an embodiment, the two reinforcement members 100 may be integrated in the faceplate 44 to form a door reinforcement device constructed as a unitary piece. A typical faceplate 44 may have 2.25 inch length and a 1.0 inch width. The mortise 48 typically has the same length and width. A typical bolt opening 42 may have a 0.875 inch diameter. In an embodiment, the long sides 114 of the reinforcement members 100 may be slightly shorter than 1.0 inch and the short sides 112 of the reinforcement members 100 may be about 0.625 inch (or about 0.725 inch the presence of the indentations 116) so that the two reinforcement members 100 may be positioned within the mortise 48 and fully covered by the faceplate 44 without hindering the movement of the locking member when the assembly is complete. The number and the position of the hooks 130 may vary. In the shown embodiment (FIGS. 7, 8 and 11), each reinforcement member 100 includes eight hooks 130 forming two rows on either sides of the internal opening 120, along the long sides 114. This configuration maximizes a distance between the two rows of hooks and provides a good compromise between the amount of material (e.g. wood) of the door stile 16 between each hook 130.

FIGS. 12*a* and 12*b* are respectively top and bottom plan views of a door reinforcement device 150 integrating a pair of reinforcement members 100. In the door reinforcement device 150, two reinforcement members 100 are fixedly connected by a pair of bridges 160 extending from lateral edges of the reinforcement members 100, at the end of the short sides 112 of the plate 110. In the door reinforcement device 150, the two reinforcement members 100 and the pair of bridges 160 form a unitary piece configured for encircling the bolt opening 42 when the door reinforcement device 150 is mounted on the door stile 16. Although the example of FIGS. 12*a* and 12*b* do not include the indentations 116, incorporating such indentations in the door reinforcement device 150 is also contemplated.

FIGS. 13*a* and 13*b* are respectively side elevation and perspective views of a door reinforcement device 180 integrating a pair of reinforcement members 100 and a deadbolt guide 190 insertable in the casing 39 that, in turn, is inserted in the bolt opening 42 formed on a door stile 16. Some deadbolt locks 30 do not include the casing 39 and the deadbolt guide 190 may be directly insertable in the bolt opening 42. The door reinforcement device 180 integrates features of two reinforcement members 100 and the deadbolt guide 190. Mounting the door reinforcement device 180 on the door stile 16 may involve inserting the deadbolt guide 190 in the casing 39 present in the bolt opening 42, or directly in the bolt opening 42 if there is no casing 39, and using a hammer or like tool to ensure that the hooks 130 penetrate in the material of the door stile 16. The faceplate 44 may then be installed over the door reinforcement device 180. An embodiment in which the faceplate 40 is also integrated in the door reinforcement device 180 is also contemplated. The door reinforcement device 180 may be package with a deadbolt lock 30 and be sold as a kit.

FIG. 14 shows a set including a pair of reinforcement members ready to be mounted on a strike jamb 200 of the doorframe 46. FIG. 15 shows the set including the pair of reinforcement members 100 mounted on the strike jamb 200 of the door frame 46. A bolt opening 210 is formed in the strike jamb 200 and is aligned with the bolt opening 42 formed in the door stile 16 when the door 10 is closed so that the deadbolt 40 may extend through both bolt openings 42 and 210 for locking the door 10. The same reinforcement members 100 may be positioned near the bolt opening 210, the hooks 130 being inserted in the material of the door frame 46, to strengthen the strike jamb 200. FIG. 16 shows a strike plate 220 and a latch plate 230 mounted on the strike jamb 200 of the door frame 46 over pairs of reinforcement members 100. Instead of mounting the reinforcement members 100 on the strike jamb 200, the door reinforcement device 150 of FIGS. 12*a* and 12*b*, or a device integrating the strike plate 210 and the reinforcement members 100 as a unitary piece, may alternatively be mounted on the strike jamb 200.

Although not shown on FIG. 16, two pairs of reinforcement members 100 are mounted on the strike jamb 200. One pair is mounted near the bolt opening 210, as shown on FIG. 15, and is hidden by the strike plate 220. Another pair is mounted near a latch opening 240, which is also formed on the strike jamb 200, and is hidden by the latch plate 230. Given that the strike jamb 200 may have a width that is greater than the width of the door stile 16, the strike plate 220 and the latch plate 230 may also be larger than the faceplate 44. As such, using reinforcement members that are wider than those configured for mounting on the door stile 16 may be contemplated.

The door frame 46 may be further reinforced by the mounting of a door reinforcement set. FIG. 17 is a first side view of a back plate 250. FIG. 18 is a second side view of the back plate 250 showing a plurality of projections 260 that, in various embodiments, may be similar or equivalent to the hooks 130, some of the projections 260 optionally comprising barbs similar to the barbs 131. FIG. 19 is a perspective view of the back plate 250. Considering FIGS. 17-19, the back plate 250 has a generally rectangular shape having a plurality of small apertures 270 as best seen on the side view of FIG. 17. In the non-limiting embodiment of FIGS. 17-19, the projections 260 are formed by perforating the back plate 250 to form the apertures 270 and bending the material released from the apertures 270 into the projections 260. One or two larger apertures 280 (two are shown) adapted for matching the bolt opening 210 and the latch opening 240 formed on the strike jamb 200. Use of a smaller back plate 250 having a single aperture 280 matching the bolt opening 210 is also contemplated. It is noted that FIGS. 17-19 illustrate a prototype of the back plate 250 constructed from an ordinary mending plate. A practical realization of the back plate may have a different shape or form factor, and may include fewer apertures 270 and fewer projections 260.

FIG. 20 is a cross-sectional side view of the door frame reinforcement kit mounted on a strike jamb 200. The back plate 250 has been positioned on an inner face 202 of the strike jamb 200 and temporarily maintained in place, for example by placing a rod (now shown) through the bolt opening 210 and through the aperture 280 of the back plate 250. Two reinforcement members 100 (or the door reinforcement device 150) are mounted on an outer face 204 of the strike jamb 200, as shown on FIG. 15. Screws 290 are inserted through screw openings of the strike plate 220 and through the internal openings 120 of the reinforcement members 100. The screws 290 are driven through the material of the strike jamb 200 and through the back plate 250. Holes may have previously been drilled in the strike jamb 200. An installer may prefer using self-drilling screws for forcing the screws 290 through the back plate 250. As the screws 290 are tightened, the projections 260 are driven to penetrate in the material of the strike jamb 200. The combination of the two reinforcement members 100 and of the back plate 250 on opposite faces of the strike jamb greatly improves the impact resistance of the strike jamb 250.

In a variant, the strike plate 250 may be integrated with the reinforcement members 100 to form a unitary piece. In another variant, the plate 250 may be provided without the small apertures 270 and the screws 290 may be of the self-drilling type, able to penetrate through the material of the plate 250. Although not shown on FIG. 20, the reinforcement members 100 and the strike plate 220 may be inserted in a mortise formed on the outer face of the strike jamb.

A door security kit may include various components of the above described embodiments. For example and without limitation, a door security kit may include four reinforcement members 100 and the back plate 250, for positioning in the manners shown on FIGS. 9 and 20. A door security kit may alternatively include two door reinforcement devices 150 and the back plate 250, the door reinforcement device 180, two reinforcement members 100 and the back plate 250, or any other equivalent combination.

Figure 4:
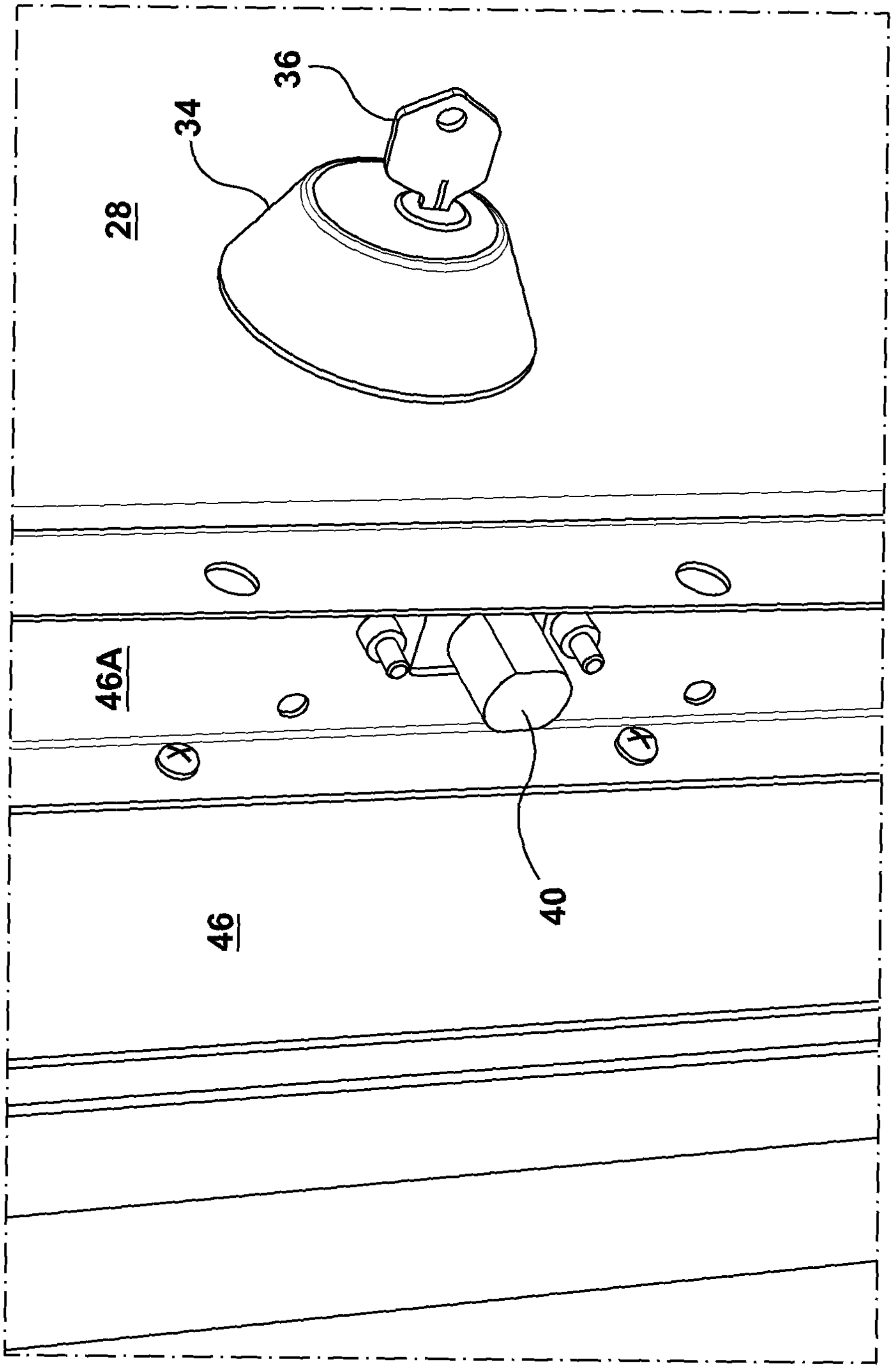
Figure 4 (Prior Art)
FIG. 4 (Prior Art) shows a complete installation of the door 10, the deadbolt lock 30 and the door frame 46.
Figure 5:
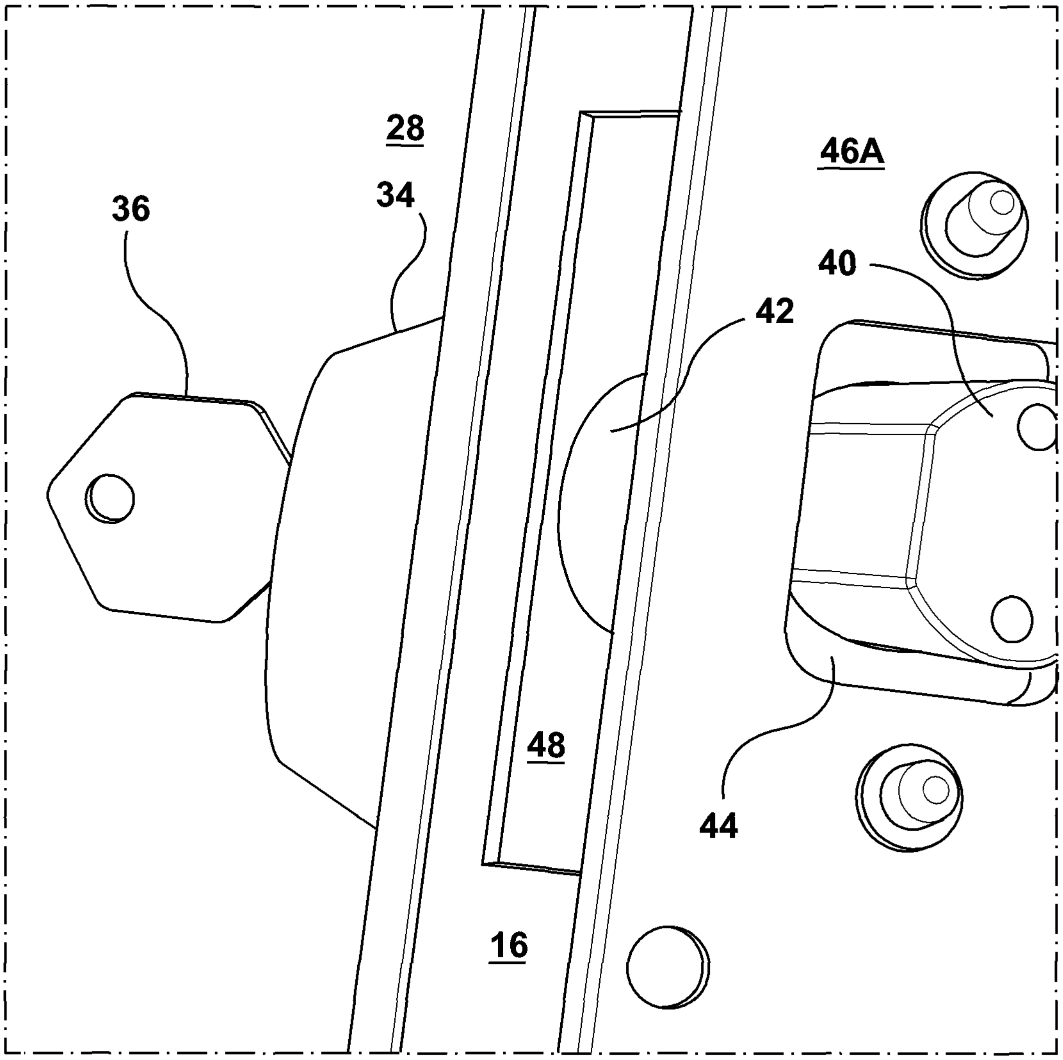
Figure 5 (Prior Art)
FIGS. 5 and 6 (Prior Art) illustrate damage that may result from moderate impacts on the door.
Figure 6:
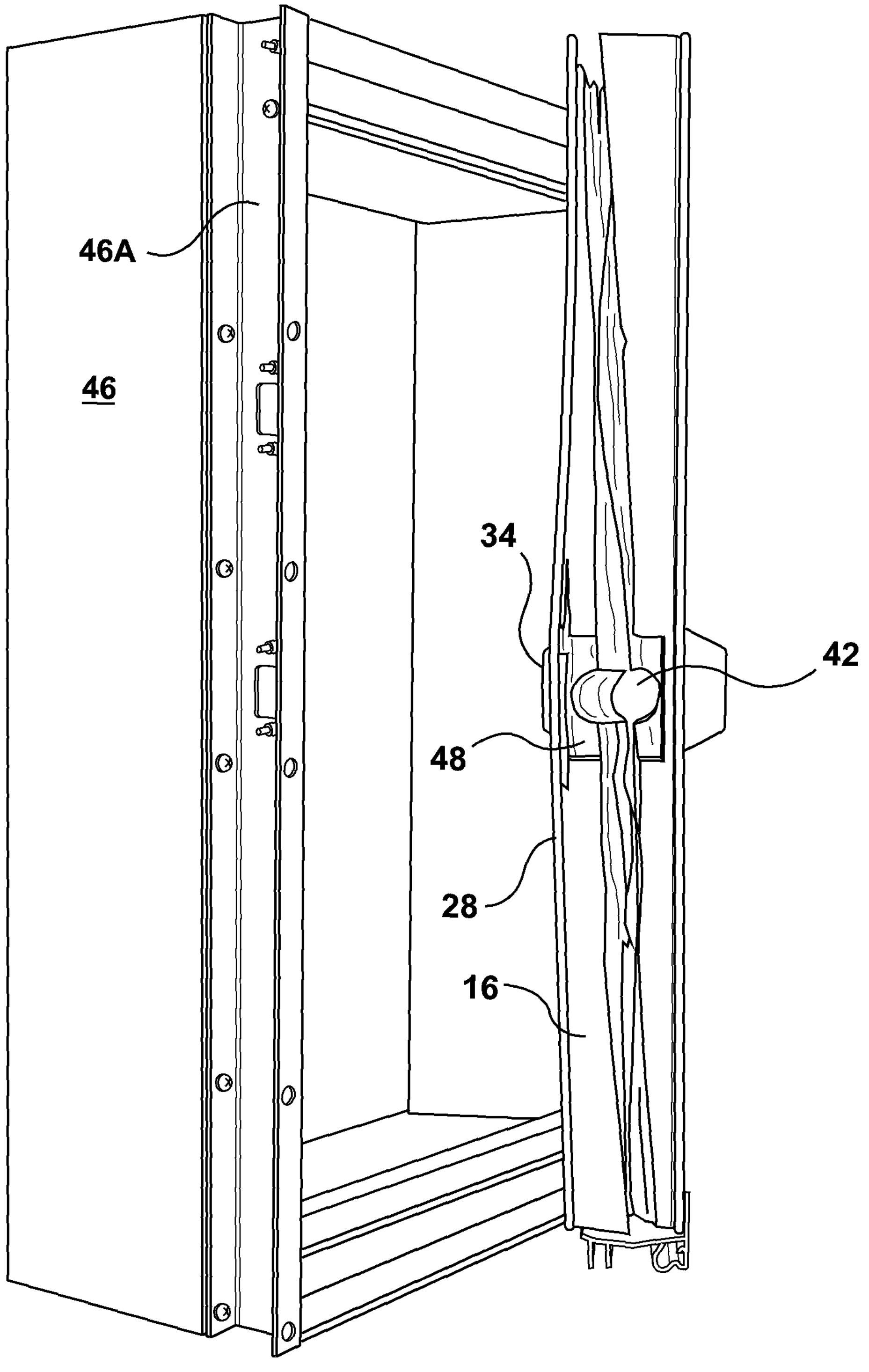
Figure 6 (Prior Art)

FIG. 21 is a front view of the door stile 16 of the faceplate 44 and of the deadbolt 40 after impact on the door 10, the door stile 16 being reinforced by the addition of a pair of reinforcement members 100. FIG. 22 is a side view of the door stile 16, of the faceplate 44, of the deadbolt guide 190 and of the pair of reinforcement members 100 after impact on the door. FIG. 23 is a front view of the pair of reinforcement members 100 on the door stile 16 after impact on the door 10. These FIGS. 21, 22 and 23 show test results obtained after provision on the door 10 of an impact of similar magnitude as used to provide the result of FIG. 6. In the context of these tests, the reinforcement members 100 were installed on the door stile 16, and the door 10 was mounted on the door frame 46 with the metal subframe 46A (FIG. 4) so that, in that configuration, a major portion of the eventual damage on the door assembly would be sustained by the door 10 itself, as in the case of FIG. 6, and not on the door frame 46.

In more details, FIG. 21 shows that the door 10 has not cracked along the door stile 16 and that there is some damage on the faceplate 44 and that the steel sheets 28 are not significantly bent in areas close to the bolt opening 42. Surprisingly, the deadbolt 40 broke out of the door 10; in this context, the deadbolt 40 has become the weakest part of the door assembly. FIG. 22 further shows damage on the faceplate 44. On FIG. 22, a deadbolt guide 41 (not integrated with the reinforcement members 100) was extracted in part from the bolt opening 42, after execution of the test, in order to show that the reinforcement members 100 have remained in place in the mortise 48 formed in the door stile 16. FIG. 23 also shows that the reinforcement members 100 have remained in place. A part of the bolt extension 38 is visible, owing to the removal of the broken deadbolt 40.

While tests have not been formally executed using the Standard Test Methods for Security of Swinging Door Assemblies (ASTM F476-14), it is expected that a conventional laminated door 10 installed in a standard wooden frame 46 (without the metal subframe 46A) would only reach level 1 as defined in ASTM F476-14 and that the same laminated door 10 installed in the same wooden frame 46, with addition of the present home reinforcement members, could at least reach level 3 as defined in ASTM F476-14. Actual results may depend on the quality of other hardware, such as the door latch or deadbolt 40, mounted on the door 10.

Those of ordinary skill in the art will realize that the description of the reinforcement member for a door, the door reinforcement set, the door reinforcement device, the door frame reinforcement kit and the door security kit are illustrative only and are not intended to be in any way limiting. Other embodiments will readily suggest themselves to such persons with ordinary skill in the art having the benefit of the present disclosure. Furthermore, the disclosed reinforcement member for a door, door reinforcement set, door reinforcement device, door frame reinforcement kit and door security kit may be customized to offer valuable solutions to existing needs and problems related to the weaknesses of laminated doors and of related door frames. In the interest of clarity, not all of the routine features of the implementations of the reinforcement member for a door, the door reinforcement set, the door reinforcement device, the door frame reinforcement kit and the door security kit are shown and described. In particular, combinations of features are not limited to those presented in the foregoing description as combinations of elements listed in the appended claims form an integral part of the present disclosure. It will, of course, be appreciated that in the development of any such actual implementation of the reinforcement member for a door, the door reinforcement set, the door reinforcement device, the door frame reinforcement kit and the door security kit, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of home security having the benefit of the present disclosure.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. A door reinforcement device for mounting on a door stile of a door, comprising:

two reinforcement members, each reinforcement member comprising:

a plate; and a plurality of hooks extending on one face of the plate;

wherein each reinforcement member is shaped for mounting on the door stile on a respective side of a locking member opening formed on the door stile and for being maintained on the door stile by insertion of the hooks in a material of the door stile, a width of the plate being configured for allowing the plate to be contained within a width of the door stile;

wherein the two reinforcement members are fixedly connected by a pair of bridges extending from lateral edges of the two reinforcement members so that the two reinforcement members and the pair of bridges form a unitary piece configured for encircling the locking member opening when the door reinforcement device is mounted on the door stile;

wherein the one face of the plate is configured for coming in contact with the material of the door stile when the hooks are fully inserted in the material of the door stile;

wherein the material of the door stile is reinforced by full insertion of the hooks in the material of the door stile;

wherein each plate has a generally rectangular perimeter;

wherein the generally rectangular perimeter of each plate includes two opposite short sides and two opposite long sides perpendicular to the short sides, the long sides defining the width of that plate; and wherein one of the long sides of each plate includes an indentation adapted for allowing movement of a locking member when the reinforcement device is mounted on the door stile.

2. The reinforcement device of claim 1, further comprising one or more barbs formed on one or more of the hooks.

3. The reinforcement member of claim 1, wherein:

the plate includes an internal opening within the generally rectangular perimeter;

the hooks are neighbors to the internal opening;

the hooks are distributed on two rows on both sides of the internal opening; and the plate further comprises additional openings adjacent to the internal opening.

* * * * *